(12) United States Patent
Kanno et al.

(10) Patent No.: US 12,045,514 B2
(45) Date of Patent: *Jul. 23, 2024

(54) METHOD OF CONTROLLING NONVOLATILE MEMORY BY MANAGING BLOCK GROUPS

(71) Applicant: KIOXIA CORPORATION, Tokyo (JP)

(72) Inventors: Shinichi Kanno, Ota (JP); Takehiko Kurashige, Ome (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,794

(22) Filed: Apr. 24, 2023

(65) Prior Publication Data

US 2023/0259308 A1 Aug. 17, 2023

Related U.S. Application Data

(63) Continuation of application No. 17/662,130, filed on May 5, 2022, now Pat. No. 11,675,544, which is a (Continued)

(30) Foreign Application Priority Data

Aug. 29, 2019 (JP) .................................. 2019-157076

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0631* (2013.01);
(Continued)

(58) Field of Classification Search
CPC ...... G06F 3/0646; G06F 3/061; G06F 3/0658; G06F 3/068; G06F 12/0811; G06F 13/1694; G06F 2212/1021; G06N 3/08
(Continued)

(56) References Cited

U.S. PATENT DOCUMENTS 11,182,300 B2 * 11/2021 Oh .......................... G06F 3/0614
2010/0325345 A1 12/2010 Ohno et al.
(Continued)

FOREIGN PATENT DOCUMENTS

JP 2012-48746 A 3/2012

*Primary Examiner* — Mardochee Chery
(74) *Attorney, Agent, or Firm* — Oblon, McClelland, Maier & Neustadt, L.L.P.

(57) ABSTRACT

According to one embodiment, a memory system writes first write data into each non-defective physical block belonging to a first write destination block group. The memory system notifies a host of a first identifier of the first write data, an address specifying the first write destination block group, a first offset indicating a top write destination physical storage location in the first write destination block group in which the first write data is written, length of the first write data, and first bitmap information including a plurality of bits, each of the bits corresponding to each of physical blocks belonging to the first write destination block group and indicating whether or not the corresponding physical block is a defective block.

10 Claims, 23 Drawing Sheets

Related U.S. Application Data continuation of application No. 16/815,594, filed on Mar. 11, 2020, now Pat. No. 11,366,612.

(52) U.S. Cl.
CPC .............. *G06F 3/064* (2013.01); *G06F 3/065* (2013.01); *G06F 3/0679* (2013.01)

(58) Field of Classification Search
USPC ........................................................ 711/154
See application file for complete search history.

(56) References Cited

U.S. PATENT DOCUMENTS

| | | |
|---|---|---|
| 2018/0307431 A1 | 10/2018 | Gunnam et al. |
| 2019/0012098 A1 | 1/2019 | Hashimoto |
| 2019/0129862 A1 | 5/2019 | Yoshida et al. |
| 2020/0089430 A1 | 3/2020 | Kanno |

\* cited by examiner

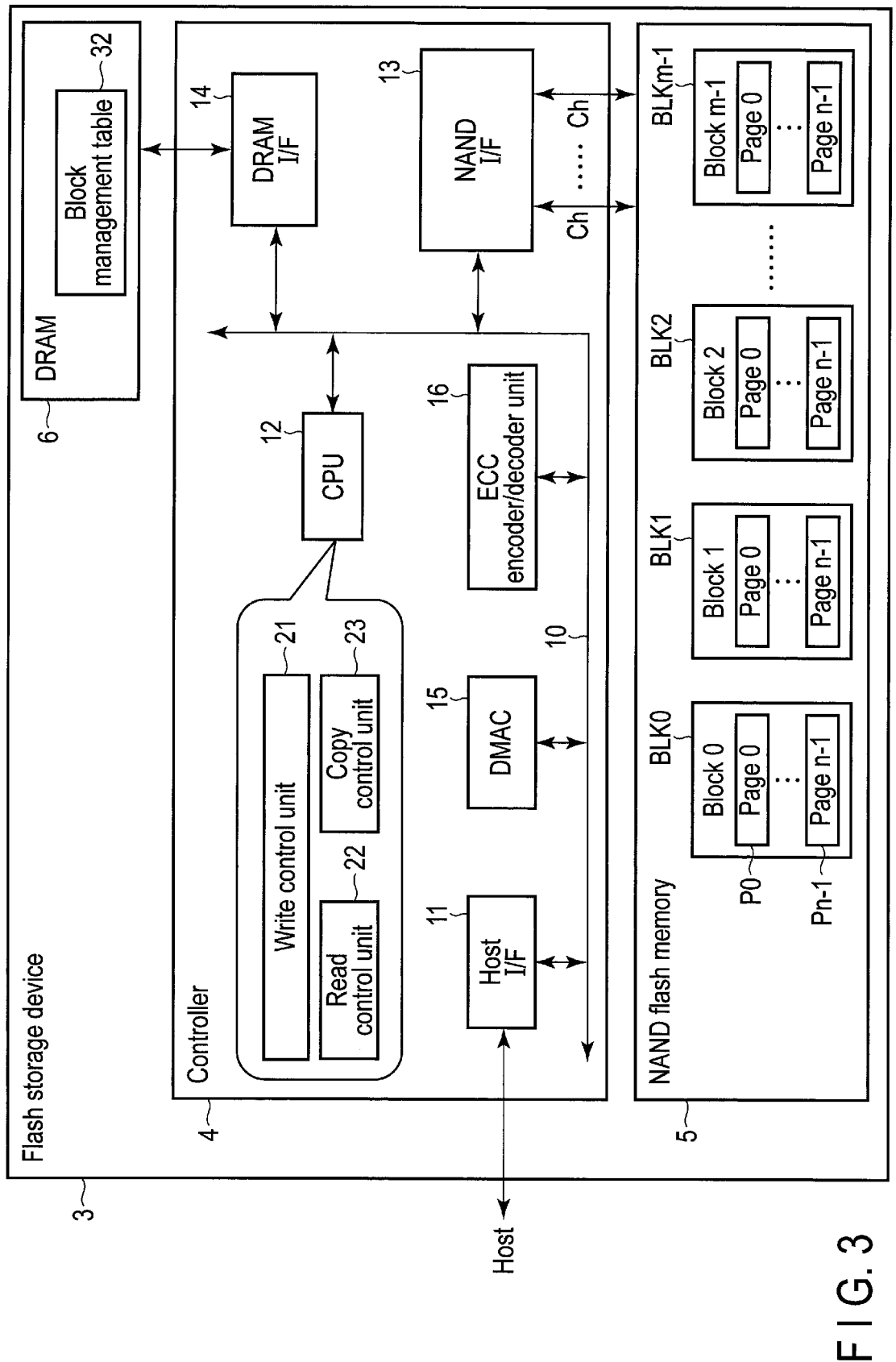
F I G. 3

FIG. 5

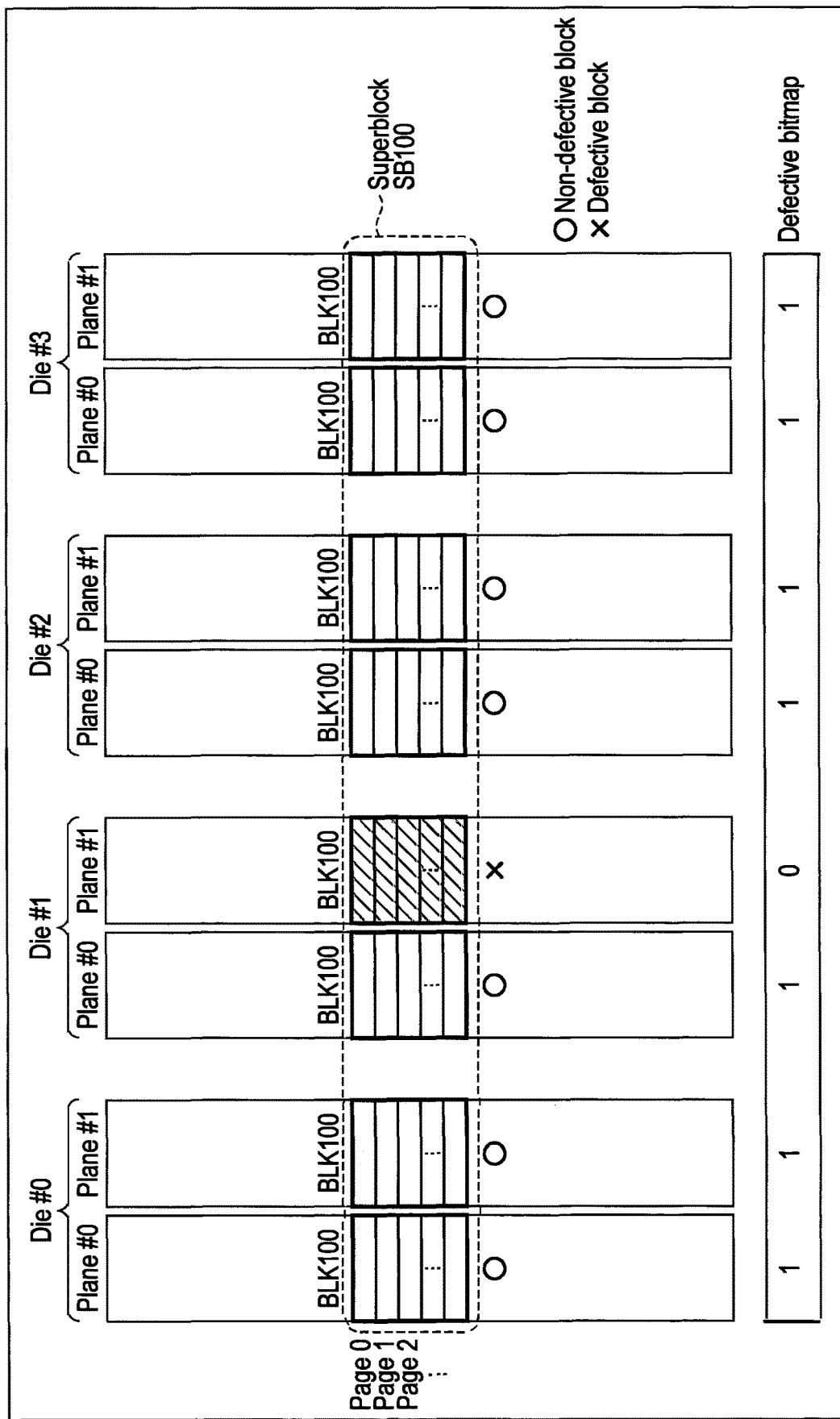
F I G. 6

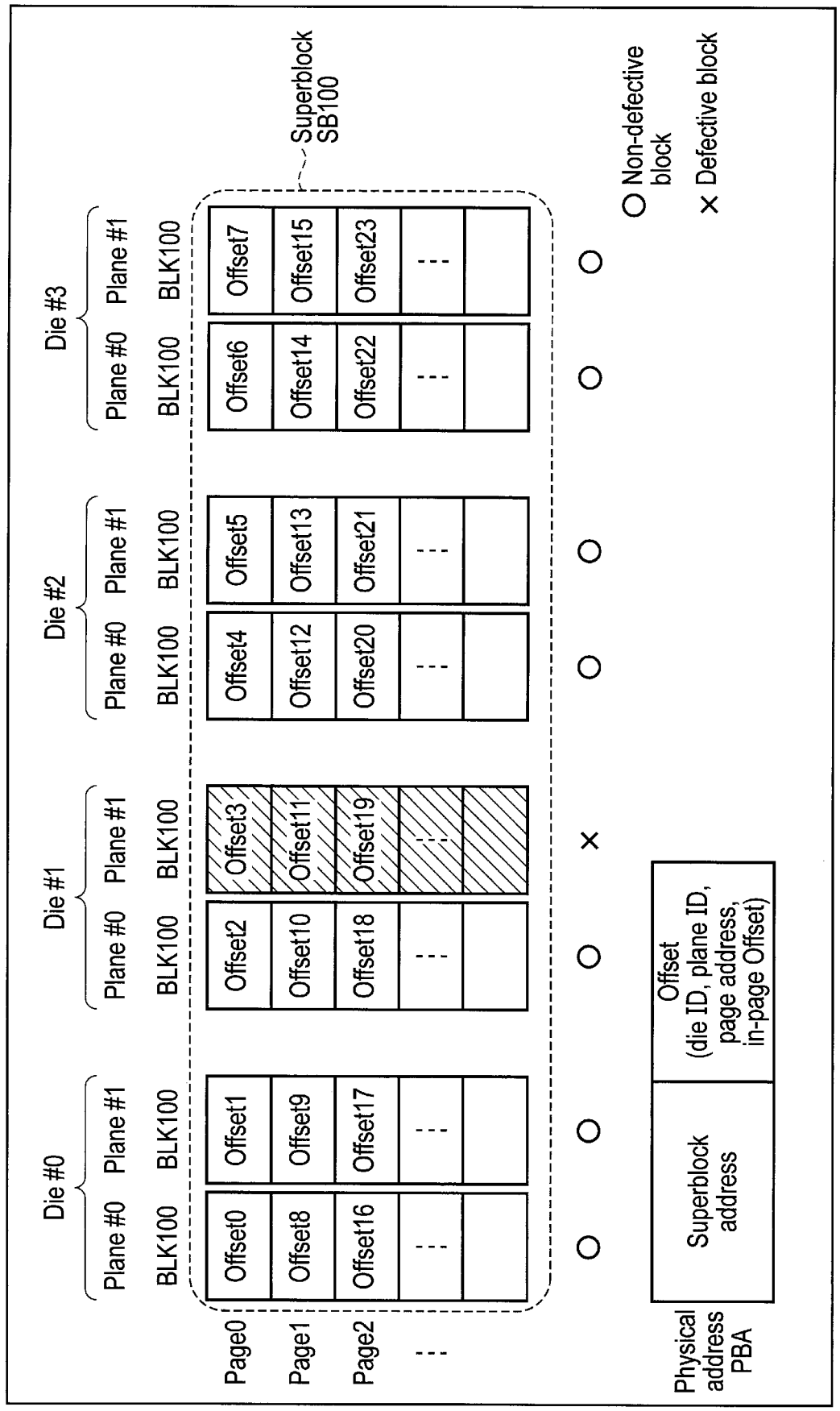
F I G. 8

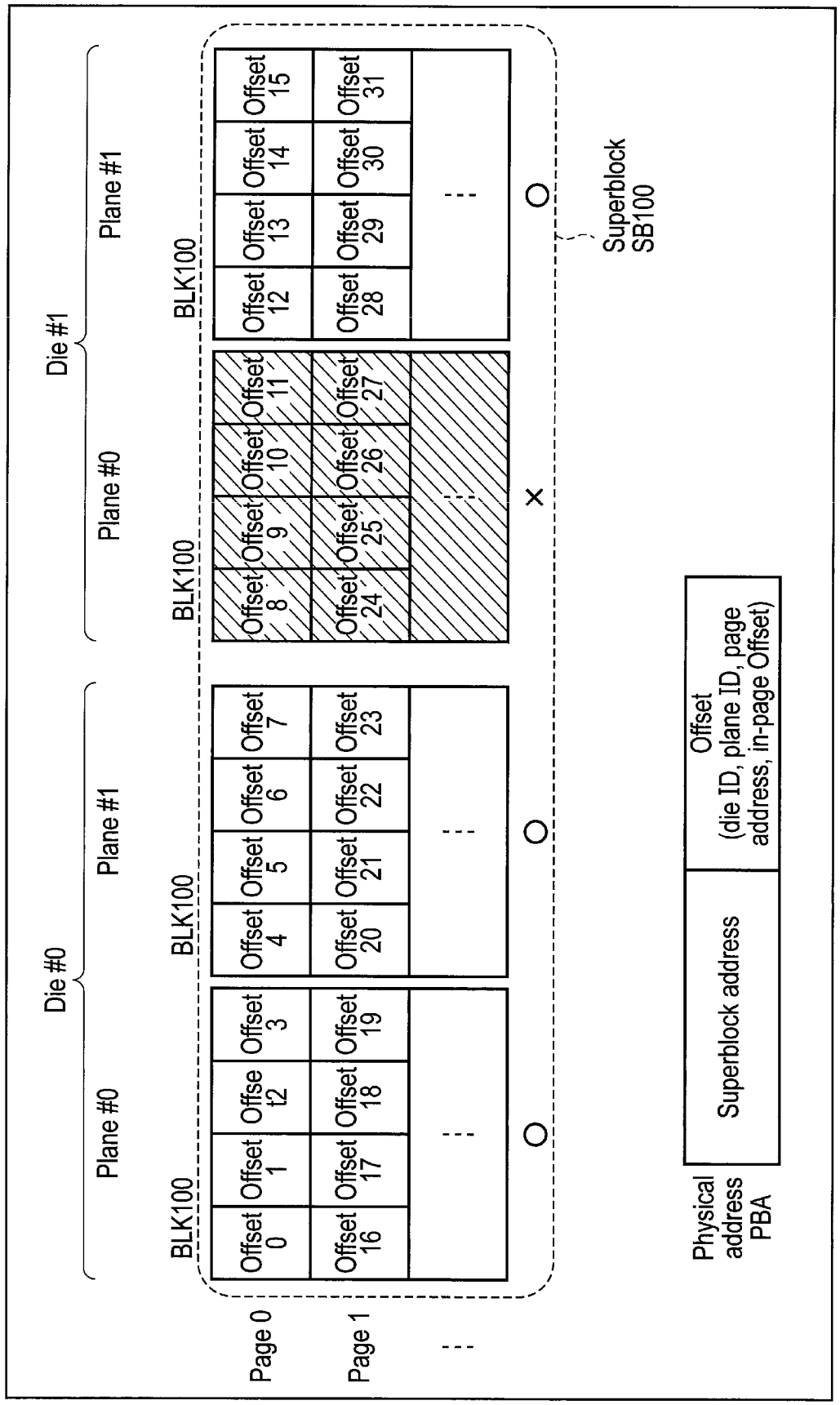
F I G. 14

Write command

| | Descriptions |
|---|---|
| Command ID | Command ID of write command |
| Tag | Identifier of data to be written (e.g., LBA, key of key-value store, or hash value of key) |
| Length | Length of data to be written |
| Write buffer address | Location in write buffer of host where data to be written is stored |

F I G. 17

Address recording request

| | Descriptions |
|---|---|
| Tag | Identifier of data (e.g., LBA) |
| Superblock address | Address of superblock in which data is written |
| Offset | Offset indicating top physical storage location in superblock in which data is written |
| Length | Length of data written |
| Defect bitmap | Defect identification information indicating whether each physical block in superblock is available |
| Length of defect bitmap | Length of defect bitmap indicating number of bits included in bitmap |

F I G. 18

Read command

| | Descriptions |
|---|---|
| Command ID | Command ID of read command |
| Physical address | Physical address indicating physical storage location in which data to be read is stored<br>Physical address expressed by superblock address and Offset |
| Length | Length of data to be read |
| Read buffer address | Location in read buffer of host to which data is to be transferred |

FIG. 19

Copy command

| | Descriptions |
|---|---|
| Command ID | Command ID of copy command |
| Source physical address | Superblock address of copy source superblock |
| Destination physical address | Superblock address of copy destination superblock |
| Valid bitmap | Valid bitmap indicating whether each piece of data stored in copy source superblock is valid data or invalid data |

FIG. 21

Address change request

| | Descriptions |
|---|---|
| Tag of each piece of data copied | Each tag indicating identifier of data copied |
| Length | Length of data copied |
| Copy source superblock address | Address of copy source superblock |
| Top copy source location in copy source superblock | Offset indicating top copy source location in copy source superblock |
| Valid bitmap | Valid bitmap indicating whether valid data is present in each physical storage location in copy source superblock |
| Copy destination superblock address | Address of copy destination superblock |
| Top copy destination location in copy destination superblock | Offset indicating top copy destination location in copy destination superblock |
| Defect bitmap | Defect identification information indicating whether each physical block in copy destination superblock is available |
| Length of defect bitmap | Length of defect bitmap indicating number of bits included in bitmap |

FIG. 22

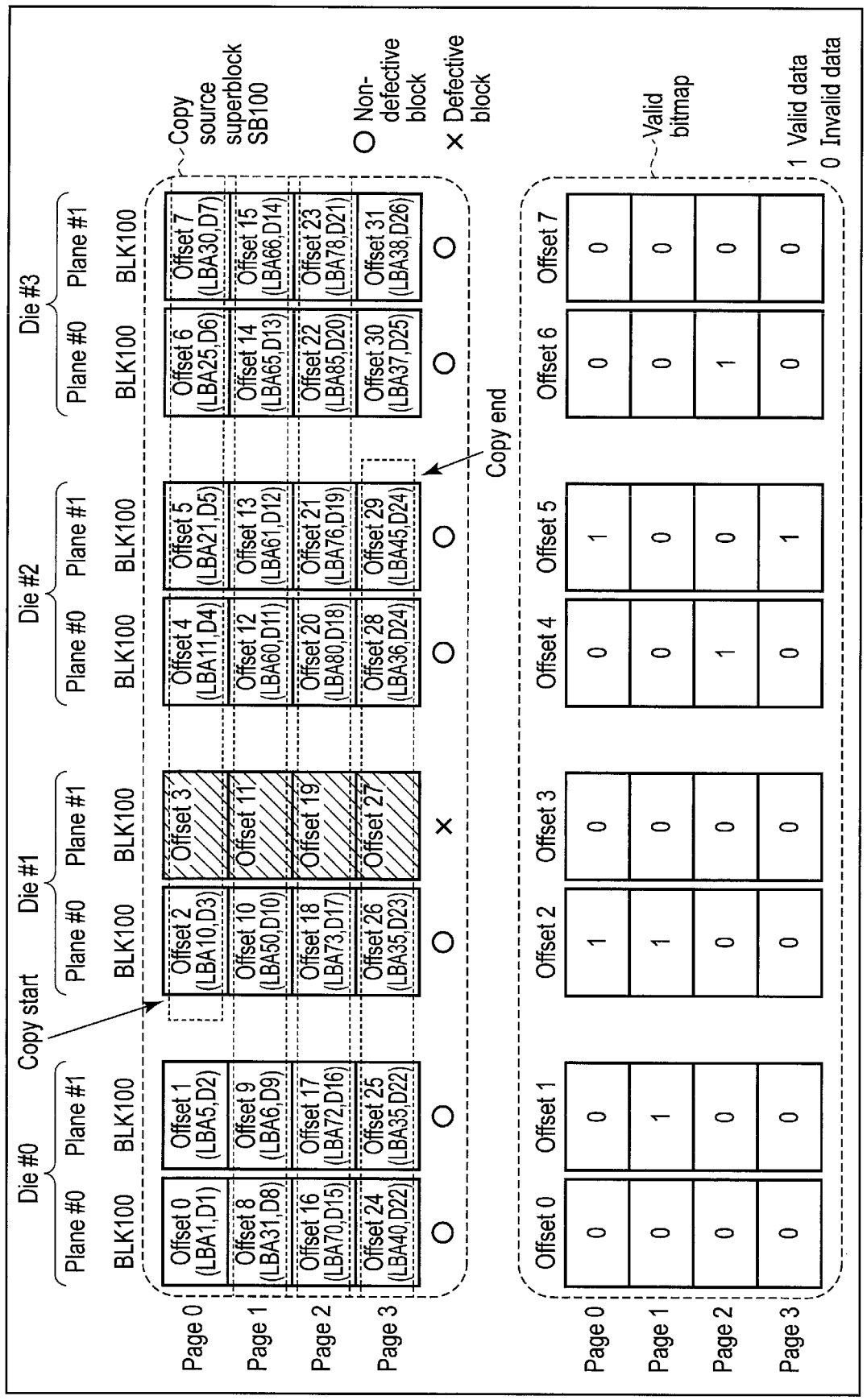
F I G. 23

METHOD OF CONTROLLING NONVOLATILE MEMORY BY MANAGING BLOCK GROUPS

CROSS-REFERENCE TO RELATED APPLICATIONS

This application is a continuation of and claims benefit under 35 U.S.C. § 120 to U.S. application Ser. No. 17/662,130, filed May 5, 2022, which is a continuation of and claims benefit under 35 U.S.C. § 120 to U.S. application Ser. No. 16/815,594, filed Mar. 11, 2020, which is based upon and claims the benefit of priority under 35 U.S.C. § 119 from Japanese Patent Application No. 2019-157076, filed Aug. 29, 2019, the entire contents of each of which are incorporated herein by reference.

FIELD

Embodiments described herein relate generally to a technology of controlling a nonvolatile memory.

BACKGROUND

Recently, a memory system including a nonvolatile memory has been widespread. As an example of such a memory system, a solid state drive (SSD) based on a NAND flash technology has been known.

The SSD is used as a storage device for various host computer systems, such as a server in a data center.

A storage for use in a host computer system like a server, needs high I/O performance.

Thus, a new interface between a host and a storage has been proposed recently.

BRIEF DESCRIPTION OF THE DRAWINGS

FIG. 3 is a block diagram illustrating an exemplary configuration of the memory system according to the embodiment.

FIG. 5 is a diagram illustrating an exemplary configuration of one block group (superblock) resulting from a set of pluralities of physical blocks.

FIG. 6 is a diagram illustrating an exemplary block group including a defective physical block.

FIG. 8 is a diagram illustrating an exemplary physical address allocated to each physical storage location in the block group of FIG. 7.

FIG. 14 is a diagram illustrating another exemplary physical address specifying each physical storage location in the block group.

FIG. 17 is a table for describing a write command that the memory system according to the embodiment issues.

FIG. 18 is a table for describing an address recording request that the memory system according to the embodiment sends to the host.

FIG. 19 is a table for describing a read command that the memory system according to the embodiment issues.

FIG. 21 is a table for describing a copy command that the memory system according to the embodiment issues.

FIG. 22 is a table for describing an address change request that the memory system according to the embodiment sends to the host.

FIG. 23 is a diagram illustrating an exemplary copy source superblock and an exemplary valid bitmap corresponding to the copy source superblock.

DETAILED DESCRIPTION

Various embodiments will be described hereinafter with reference to the accompanying drawings.

In general, according to one embodiment, a memory system connectable to a host includes: a nonvolatile memory including a plurality of nonvolatile memory dies each including a plurality of physical blocks; and a controller electrically connected to the nonvolatile memory and configured to control a plurality of block groups each including a plurality of physical blocks selected from the nonvolatile memory dies.

In response to receiving a write request from the host, the write request specifying a first identifier of identifying first write data to be written and length of the first write data, the controller allocates a block group from the block groups as a first write destination block group, and writes the first write data into each non-defective physical block belonging to the first write destination block group, in units of first data sizes, such that writing to a defective physical block belonging to the first write destination block group is skipped.

The controller notifies the host of first information including: the first identifier; an address specifying the first write destination block group; a first offset indicating a top write destination physical storage location in the first write destination block group in which the first write data is written; the length of the first write data; and first bitmap information including a plurality of bits, each of the plurality of bits corresponding to each of the physical blocks belonging to the first write destination block group, each of the plurality of bits having a value indicating whether or not the corresponding physical block is a defective block.

Figure 1:
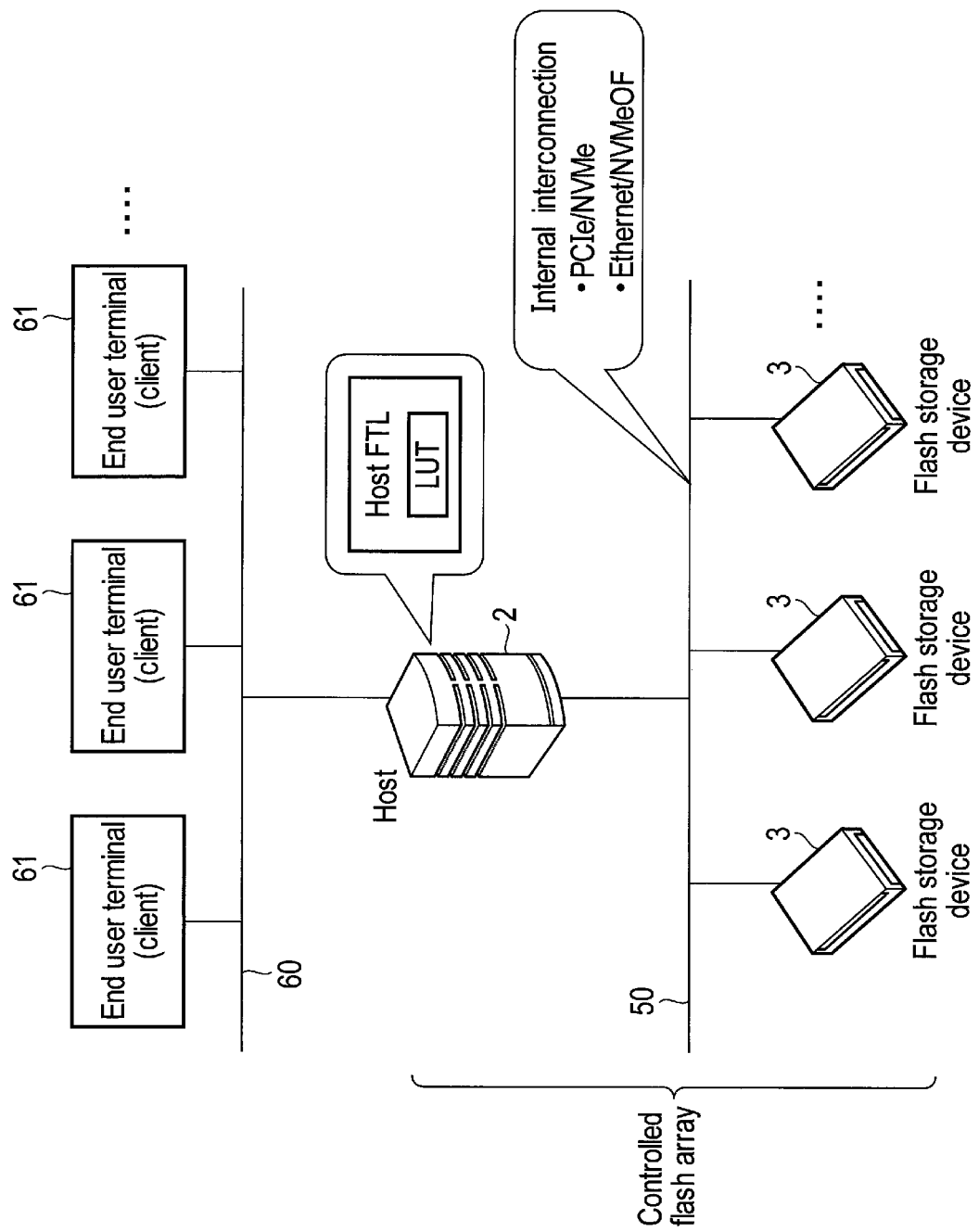
FIG. 1 is a block diagram illustrating the relationship between a host and a memory system according to an embodiment.

First, the relationship between a memory system according to the present embodiment and a host will be described with reference to FIG. 1.

The memory system is a semiconductor storage device that writes data into a nonvolatile memory and reads the data from the nonvolatile memory. The memory system is achieved as a flash storage device 3 based on a NAND flash technology.

The host (host device) 2 is configured to control a plurality of flash storage devices 3. The host 2 is realized by an information processing apparatus that uses a flash array including the plurality of flash storage devices 3 as storage. The information processing apparatus may be a personal computer or a server computer.

Note that the flash storage device 3 may be used as one of a plurality of storage devices provided in a storage array. The storage array may be connected with an information processing apparatus like a server computer through a cable or a network. The storage array includes a controller that controls the plurality of storages in the storage array (e.g., a plurality of flash storage devices 3). In a case where the flash storage device 3 is applied to the storage array, the controller of the storage array may function as a host for the flash storage device 3.

An example that the information processing apparatus such as a server computer functions as the host 2 will be described below.

The host (i.e., server) 2 and the plurality of SSD 3 are interconnected via an interface 50 (i.e., internal interconnection). Examples of the interface 50 for the interconnection that can be used, include, but are not limited to, PCI Express (PCIe) (registered trademark), NVM Express (NVMe) (registered trademark), Ethernet (registered trademark), and NVMe over Fabrics (NVMeOF).

A typical example of the server computer that functions as the host 2, is a server computer in a data center (hereinafter, referred to as a server).

In a case where the host 2 is realized by the server in the data center, the host (server) 2 may be connected with a plurality of end user terminals (clients) 61 through a network 60. The host 2 is capable of providing various services to the end user terminals 61.

Examples of the services available from the host (server) 2 include (1) Platform as a Service (PaaS) that provides a system running platform to each client (each end user terminal 61) and (2) Infrastructure as a Service (IaaS) that provides an infrastructure like a virtual server to each client (each end user terminal 61).

A plurality of virtual machines may be executed on a physical server that functions as the host (server) 2. Each virtual machine that runs on the host (sever) 2 is capable of functioning as a virtual server that provides various services to the client (end user terminal 61) corresponding to the virtual machine. In each virtual machine, an operating system and a user application for use in the end user terminal 61 corresponding to the virtual machine are executed.

In the host (server) 2, a flash translation layer (host FTL) is executed. The host FTL includes a lookup table (LUT) that is an address translation table for management of mapping between each data identifier (tag) for identifying data to be accessed and each physical address of the nonvolatile memory in the flash storage device 3. Use of the LUT enables the host FTL to grasp data placement on a nonvolatile memory in the flash storage device 3.

The flash storage device 3 includes a nonvolatile memory such as a NAND flash memory. The nonvolatile memory includes a plurality of blocks each including a plurality of pages. The blocks each are a unit of erasing of data, and each of the plurality of pages is a unit of writing of data or a unit of reading of data.

The flash storage device 3 is capable of executing low-level abstraction. The low-level abstraction is a function for abstraction of the nonvolatile memory. The low-level abstraction includes a function of assisting data placement. Examples of the function of assisting data placement may include a function of allocating a write destination block into which user data received from the host 2 is to be written, a function of determining the write destination location (write destination block, location in the write destination block) of the user data, and a function of notifying the upper layer (host 2) of the write destination location (block address, offset) in which the user data is written.

In addition, examples of the function of assisting data placement may include a function of allocating a copy destination block to which user data already written in the nonvolatile memory is to be copied, a function of determining the copy destination location (copy destination block, location in the copy destination block) of the user data, and a function of notifying the upper layer (host 2) of the copy destination location (block address, offset) to which the user data is copied.

The flash storage device 3 executes various commands received from the host 2. The commands include a write command for writing data into the nonvolatile memory in the flash storage device 3 and a read command for reading data from the nonvolatile memory. According to the present embodiment, each read command specifies a physical address indicating a location in which data to be read is stored. The physical address is expressed by the block address of a block to be read and the offset (in-block offset) indicating a storage location to be read in the block to be read.

The flash storage device 3 receives, from the host 2, each read command specifying the block address of a block to be read and the offset indicating a storage location to be read in the block to be read, and executes a data read operation in response to each read command received.

Figure 2:
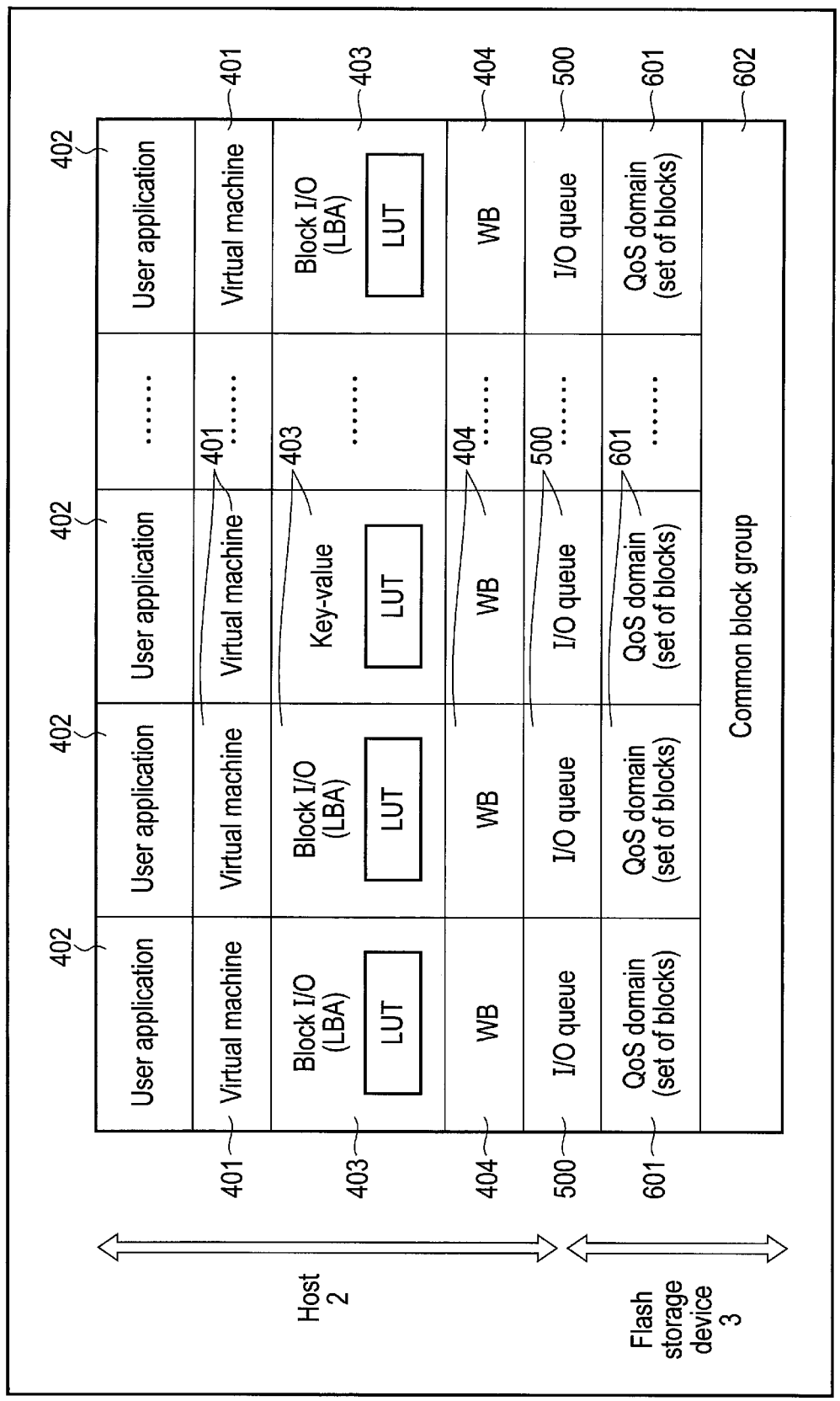
FIG. 2 is a diagram for describing the division of roles between the host and the memory system according to the embodiment.

FIG. 2 illustrates the division of roles between the flash storage device 3 and the host 2.

In the host (server) 2, a plurality of virtual machines 401 corresponding one-to-one to a plurality of end users is executed. In each virtual machine 401, an operating system and a user application 402 that the corresponding end user uses, are executed.

In addition, in the host (server) 2, a plurality of I/O services 403 corresponding one-to-one to the plurality of user applications 402, is executed. The I/O services 403 each may include a block I/O service based on a logical block address (LBA) or a key-value store service. Each I/O service 403 includes a lookup table (LUT) for management of mapping between each tag and each physical address of the flash storage device 3.

Here, the tag means an identifier with which data to be accessed can be identified. A typical example of the tag is, but is not limited to, a logical address like the LBA. Alternatively, a user address (e.g., a key in the key-value store or a hash value of the key) may be used as the tag.

The physical address of the flash storage device 3 is intended for specifying the storage location (physical storage location) in the nonvolatile memory included in the flash storage device 3.

In the block I/O service based on the LBA, a LUT for management of mapping between each logical address (LBA) and each physical address of the flash storage device 3 may be used.

Meanwhile, in the key-value store service, a LUT for management of mapping between each key (or the hash value of each key), the physical address of the flash storage device 3 in which data corresponding to each key is stored, and the data length of the data corresponding to each key, may be used.

Each end user can select an addressing method to be used (e.g., a LBA, a key in the key-value store, or a hash value of the key).

In the host (server) 2, a plurality of write buffers (WBs) 404 corresponding one-to-one to the plurality of virtual machines 401 may be managed. Write data from a user application 402 may be temporarily stored in the write buffer (WB) 404 for the virtual machine 401 corresponding to the user application 402.

Transmission of a command from the host (server) 2 to the flash storage device 3 and a return, such as a response of completion of the command from the flash storage device 3 to the host (server) 2 are executed through an I/O queue 500 present in each of the host (server) 2 and the flash storage device 3.

The flash storage device 3 is capable of managing a plurality of regions acquired by logical division of the nonvolatile memory in the flash storage device 3, each as a QoS domain 601. Each QoS domain 601 is a subset of the plurality of blocks included in the nonvolatile memory. Each of the plurality of blocks included in the nonvolatile memory belongs only to one QoS domain 601. Thus, the same block is not allowed to belong to different QoS domains 601, simultaneously.

The QoS domains 601 each are identified with an identifier referred to as a QoS domain ID. The QoS domain IDs are used as a plurality of identifiers for one-to-one access to the plurality of regions (plurality of QoS domains).

According to the present embodiment, each write command specifies the tag of the write data (e.g., the LBA of the write data) and the length of the write data. In a case where a write command specifying the tag like the LBA and the length of the write data is received from the host 2, the flash storage device 3 selects one block from a group of free blocks and allocates the selected block as a write destination block. In a case where the flash storage device 3 manages the plurality of QoS domains 601, a common block group 602 shared between the plurality of QoS domains 601 may be used as the free block group.

Here, the write destination block means a block into which data is to be written. According to the present embodiment, a plurality of block groups is managed, each block group including a plurality of physical blocks selected from a plurality of nonvolatile memory dies (also referred to as nonvolatile memory chips) included in the flash storage device 3. Each block group includes a plurality of physical blocks selected from different nonvolatile memory dies (also referred to as nonvolatile memory chips). Thus, writing of data into the plurality of physical blocks belonging to a block group and reading of data from the physical blocks can be executed in parallel. The block groups each are also referred to as a superblock.

The flash storage device 3 selects one superblock from a free superblock group and allocates the selected superblock as a write destination superblock. The write destination superblock means a superblock into which data is to be written. Then, the flash storage device 3 writes the write data associated with the write command received from the host 2, into the write destination superblock.

The free superblock means a superblock reusable (re-allocable) (free) as a new write destination superblock. A typical example of the free superblock is a superblock storing no valid data. Valid data means the latest data associated with a tag like the LBA. That is data linked as the latest data from the LUT of the host 2 (logical physical address translation table) is valid data. Invalid data means data not associated with a tag like the LBA. Data not linked from the LUT of the host 2 is invalid data. For example, in a case where update data corresponding to a LBA is written in the flash storage device 3, the previous data corresponding to the LBA results in invalid data.

When the data associated with the received write command is written in the write destination superblock, the flash storage device 3 transmits, as an address recording request, the tag of the data, the length of the data, and the physical address (superblock address, offset) indicating the physical storage location in which the data is written, to the host 2. The address recording request is used as a physical address notification message for notifying the host 2 of the physical address (superblock address, offset) indicating the physical storage location in which the data is written.

The superblock address is intended for identifying the write destination superblock. The offset indicates the physical storage location in the write destination superblock in which the data is written.

In response to the address recording request, the host 2 can update the LUT so as to associate the physical address (superblock address, offset) with the tag like the LBA of the data.

With the LUT, the host 2 is capable of managing whether the data stored in each physical storage location of each superblock is valid data or invalid data.

FIG. 3 illustrates an exemplary configuration of the flash storage device 3.

The flash storage device 3 includes a controller 4 and a nonvolatile memory (NAND flash memory) 5. For example, the flash storage device 3 may include a DRAM 6 that is a random access memory.

The NAND flash memory 5 includes a memory cell array including a plurality of memory cells arranged in a matrix form. The NAND flash memory 5 may be a flash memory having a two-dimensional structure or a flash memory having a three-dimensional structure.

The memory cell array of the NAND flash memory 5 includes a plurality of blocks BLK0 to BLKm−1. The blocks BLK0 to BLKm−1 each include a plurality of pages (here, pages P0 to Pn−1). The blocks BLK0 to BLKm−1 each functions as a unit of erasing of data. The block is also referred to as a "erase block", a "physical block", or a "physical erase block". The pages P0 to Pn−1 each are a unit of data write operation or a unit of data read operation.

The controller 4 is electrically connected with the NAND flash memory 5 that is a nonvolatile memory, through a NAND interface 13 like a Toggle NAND flash interface or an open NAND flash interface (ONFI). The controller 4 operates as a memory controller that controls the NAND flash memory 5. The controller 4 may be achieved by a circuit like a system-on-a-chip (SoC).

Figure 4:
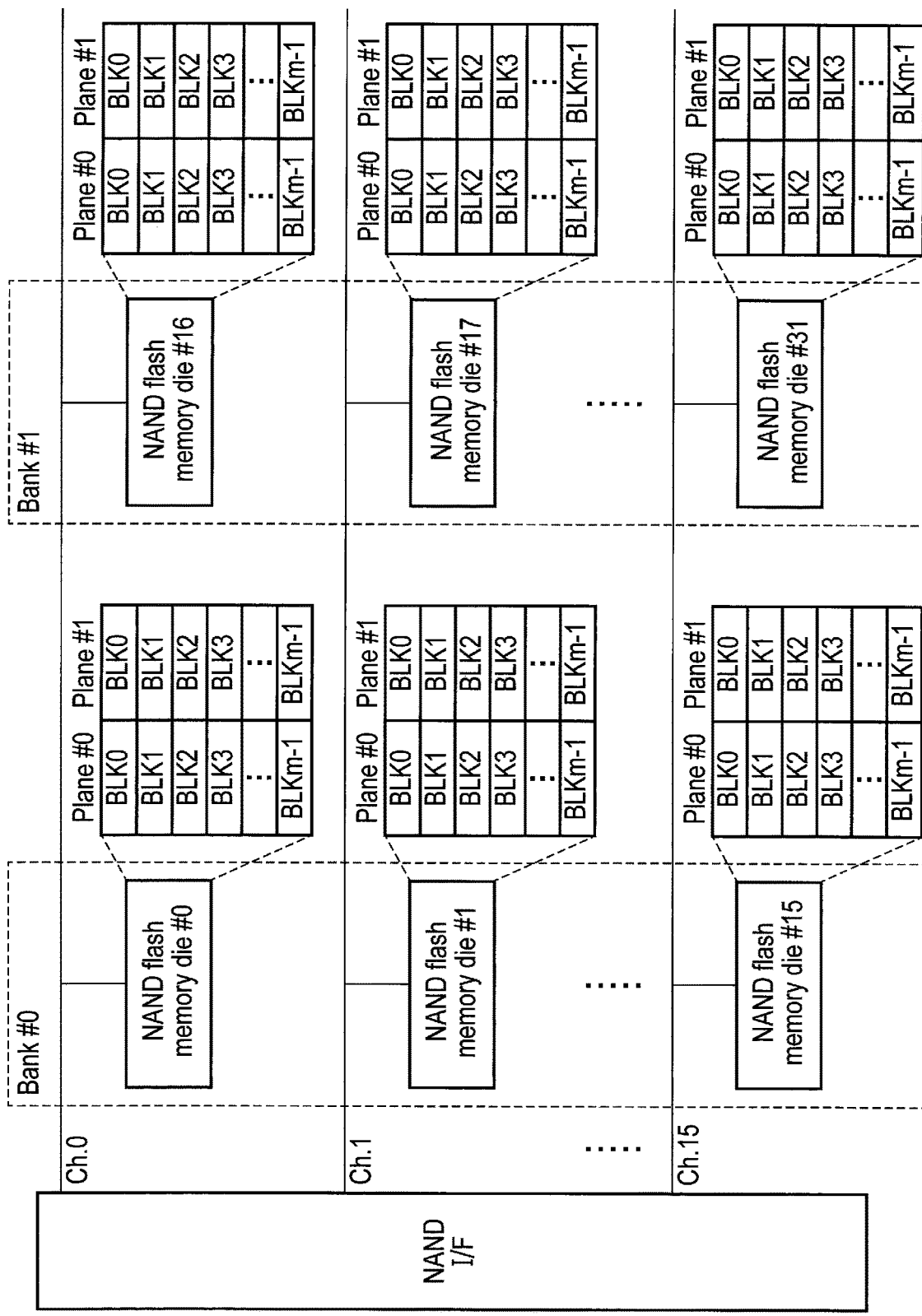
FIG. 4 is a block diagram illustrating the relationship between a NAND interface and a plurality of NAND flash memory chips, provided in the memory system according to the embodiment.

As illustrated in FIG. 4, the NAND flash memory 5 may include a plurality of NAND flash memory dies (NAND flash memory chips). Each individual NAND flash memory die is capable of operating independently. Thus, the NAND flash memory die functions as a unit enabling parallel operation. FIG. 4 exemplifies a case where the NAND interface 13 is connected with 16 channels Ch.0 to Ch.15 each connected with two NAND flash memory dies. In this case, 16 NAND flash memory dies #0 to #15 connected respectively with the channels Ch.0 to Ch.15 may be organized as a bank #0. In addition, the remaining 16 NAND flash memory dies #16 to #31 connected respectively with the channels Ch.0 to Ch.15 may be organized as a bank #1. The bank functions as a unit for parallel operation of a plurality of memory modules by bank interleaving. In the exemplary configuration of FIG. 4, the 16 channels and the bank interleaving with the two banks enable a maximum of 32 NAND flash memory dies to operate in parallel.

An erase operation may be executed in units of superblocks each including a set of pluralities of physical blocks operable in parallel. One superblock may include, but is not limited to, a total of 32 physical blocks selected one by one from the NAND flash memory dies #0 to #31. Note that the NAND flash memory dies #0 to #31 each may have a multi-plane configuration. For example, in a case where the NAND flash memory dies #0 to #31 each have a multi-plane configuration including two planes (plane #0 and plane #1), the total number of planes included in the NAND flash memory 5 is 64. One superblock may include a total of 64 physical blocks selected one by one from the 64 planes included in the NAND flash memory 5.

Figure 5:
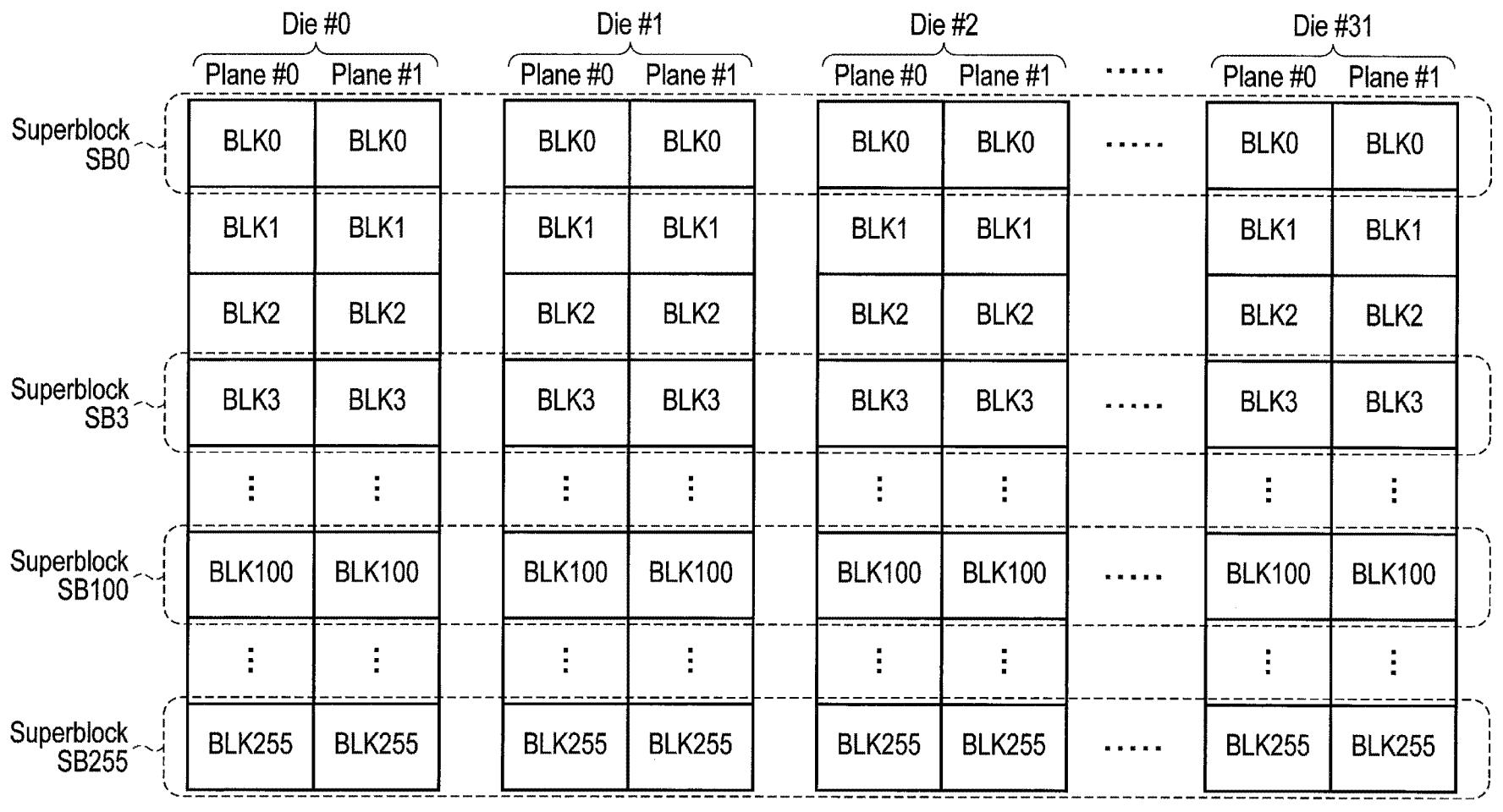

FIG. 5 illustrates exemplary configurations of some superblocks SB.

The block address of each physical block to be included in a superblock SB may be defined based on a mathematical rule from the block address (superblock address) of the superblock SB.

For example, the value acquired from the superblock address of the superblock SB subjected to predetermined four fundamental operations of arithmetic, may be determined as the block address of each physical block to be included in the superblock SB. Alternatively, the value acquired from a plurality of bits expressing the superblock address of the superblock SB, subjected to a predetermined bit invert or a predetermined bit shift, may be determined as the block address of each physical block to be included in the superblock SB.

FIG. 5 exemplifies a case where the superblock SB has physical blocks each having a block address identical to the superblock address of the superblock SB.

That is a superblock SB0 having a superblock address 0 has a physical block BLK0 having a block address 0 included in the plane #0 of the NAND flash memory die #0 (Die #0), a physical block BLK0 having a block address 0 included in the plane #1 of the NAND flash memory die #0 (Die #0), a physical block BLK0 having a block address 0 included in the plane #0 of the NAND flash memory die #1 (Die #1), a physical block BLK0 having a block address 0 included in the plane #1 of the NAND flash memory die #1 (Die #1), a physical block BLK0 having a block address 0 included in the plane #0 of the NAND flash memory die #2 (Die #2), a physical block BLK0 having a block address 0 included in the plane #1 of the NAND flash memory die #2 (Die #2), . . . , a physical block BLK0 having a block address 0 included in the plane #0 of the NAND flash memory die #31 (Die #31), and a physical block BLK0 having a block address 0 included in the plane #1 of the NAND flash memory die #31 (Die #31).

Similarly, a superblock SB255 having a superblock address 255 has a physical block BLK255 having a block address 255 included in the plane #0 of the NAND flash memory die #0 (Die #0), a physical block BLK255 having a block address 255 included in the plane #1 of the NAND flash memory die #0 (Die #0), a physical block BLK255 having a block address 255 included in the plane #0 of the NAND flash memory die #1 (Die #1), a physical block BLK255 having a block address 255 included in the plane #1 of the NAND flash memory die #1 (Die #1), a physical block BLK255 having a block address 255 included in the plane #0 of the NAND flash memory die #2 (Die #2), a physical block BLK255 having a block address 255 included in the plane #1 of the NAND flash memory die #2 (Die #2), . . . , a physical block BLK255 having a block address 255 included in the plane #0 of the NAND flash memory die #31 (Die #31), and a physical block BLK255 having a block address 255 included in the plane #1 of the NAND flash memory die #31 (Die #31).

Note that the relationship between the superblock address of a superblock and the block address of each physical block belonging to the superblock is not limited to the example of FIG. 5. A superblock may have a plurality of physical blocks having mutually different block addresses.

In some cases, each die includes a defective physical block that is unavailable (also referenced as a bad block). Generally, the number of defective physical blocks varies every die or plane.

Next, the configuration of the controller 4 of FIG. 3 will be described.

The controller 4 includes a host interface 11, a CPU 12, the NAND interface 13, a DRAM interface 14, a direct memory access controller (DMAC) 15, and an ECC encoder/decoder unit 16. The host interface 11, the CPU 12, the NAND interface 13, the DRAM interface 14, the DMAC 15, and the ECC encoder/decoder unit 16 are mutually connected through a bus 10.

The host interface 11 is a host interface circuit that executes communication with the host 2. The host interface 11 may be, for example, a PCIe controller (NVMe controller). Alternatively, in a configuration in which the flash storage device 3 is connected with the host 2 through Ethernet (registered trademark), the host interface 11 may be a NVMe over Fabrics (NVMeOF) controller.

The host interface 11 receives various commands from the host 2. The commands include a write command, a read command, a copy command, and other various commands.

The CPU 12 is a processor that controls the host interface 11, the NAND interface 13, the DRAM interface 14, the DMAC 15, and the ECC encoder/decoder unit 16. At power-on to the flash storage device 3, the CPU 12 loads a control program (firmware) from the NAND flash memory 5 or a ROM not illustrated onto the DRAM 6, and then executes the firmware to execute various types of processing. Note that the firmware may be loaded onto an SRAM not illustrated in the controller 4. The CPU 12 is capable of executing, for example, command processing for execution of various commands from the host 2. The operation of the CPU 12 is controlled by the firmware executed by the CPU 12. Note that part of the command processing or the entirety thereof may be executed by dedicated hardware in the controller 4.

The CPU 12 is capable of functioning as a write control unit 21, a read control unit 22, and a copy control unit 23. Note that part of each of the write control unit 21, the read control unit 22, and the copy control unit 23 or the entirety of each thereof may be achieved by the dedicated software in the controller 4.

When receiving a write command (write request) specifying an identifier (e.g., LBA) for identifying write data to be written and the length of the write data, from the host 2, the write control unit 21 allocates one superblock from a plurality of superblocks (free superblocks) included in the common block group 602, as the write destination superblock. In this case, the write control unit 21 may select a superblock having a minimum program/erase cycle count, from the plurality of superblocks (free superblocks) included in the common block group 602, and then may allocate the selected superblock as the write destination superblock. Note that, in a case where an available write destination superblock has already been allocated, no operation of allocating one superblock from the plurality of superblocks (free superblocks) included in the common block group 602, as the write destination superblock, is executed.

The write control unit 21 writes the write data into each available non-defective physical block belonging to the write destination superblock, in units of predetermined data sizes like page sizes, such that writing to a defective physical block belonging to the write destination superblock is skipped. Then, the write control unit 21 notifies the host 2 of the physical address indicating the physical storage location in which the write data is written. In this case, for example, the write data is written in the respective physical storage locations of some non-defective physical blocks ahead of a defective physical block and in the respective physical storage locations of some non-defective physical blocks behind the defective physical block, so that the write data is divided into two data portions corresponding to discontinuous two physical storage regions. In this case, generally, the write control unit 21 needs to notify the host 2 of physical address information for two sets corresponding one-to-one to the discontinuous two physical storage regions. In addition, in a case where the write data is written in discontinuous three physical storage regions in the write destination superblock because of the presence of some defective physical blocks, the write control unit 21 needs to notify the host 2 of physical address information for three sets corresponding one-to-one to the discontinuous three physical storage regions. Thus, in a configuration in which the write data is written into each non-defective physical block, except a defective physical block, belonging to the write destination superblock in units of the predetermined data sizes like page sizes, the amount of information necessary for notifying the host 2 of the write destination physical storage location of the write data, tends to increase.

Therefore, instead of notifying the host 2 of physical address information for a plurality of sets corresponding one-to-one to a plurality of physical storage regions that is discontinuous, the write control unit 21 notifies the host 2 of the identifier (e.g., LBA) of the write data, the top physical address in which the write data is written, the length of the write data, and a defect bitmap corresponding to the write destination superblock. The defect bitmap includes a plurality of bits corresponding one-to-one to the plurality of physical blocks belonging to the write destination superblock. The value of each bit indicates whether or not the corresponding physical block is a defective physical block.

The top physical address in which the write data is written, specifies the physical storage location in which the first data portion that is part of the write data is written. The top physical address is expressed by the address of the write destination superblock and the offset indicating the top write destination physical storage location in the write destination superblock in which the write data is written. The top write destination physical storage location is the physical storage location in which the first data portion that is part of the write data is written, in the write destination superblock.

The offset indicates the offset from the first physical storage location to the top write destination physical storage location of the write destination superblock, namely, the offset of the top write destination physical storage location to the top physical storage location of the write destination superblock. The offset from the first physical storage location to the top write destination physical storage location of the write destination superblock, may be expressed by a multiple of a size of granularity.

Alternatively, the offset may be expressed by any combination of, for example, a page address, a die identifier, a plane identifier, and an in-page offset.

In addition, in a case where the write destination superblock has physical blocks each having a block address identical to the address (superblock address) of the write destination superblock, the address (superblock address) of the write destination superblock can be expressed by the block address of each physical block.

When receiving a read command specifying a physical address (namely, superblock address and offset) from the host 2, the read control unit 22 reads data from the NAND flash memory 5, based on the block address and the offset. A superblock to be read is specified by the superblock address. A physical storage location to be read in the superblock is specified by the offset.

In response to reception of a copy request specifying the address (superblock address) of a copy source superblock and a valid bitmap corresponding to the copy source superblock from the host 2, the copy control unit 23 copies a set of pieces of valid data in the copy source superblock, to each non-defective physical block belonging to a copy destination superblock, in units of predetermined data sizes like page sizes, such that copying of any valid data to any defective physical block belonging to the copy destination superblock is skipped. In other words, the copy control unit 23 writes the set of pieces of valid data read from the copy source superblock, into each non-defective physical block belonging to the copy destination superblock, in units of the predetermined data sizes like page sizes, such that copying of any valid data to any defective physical block belonging to the copy destination superblock is skipped.

Then, the copy control unit 23 notifies the host 2 of the physical address indicating the copy destination physical storage location to which the set of pieces of valid data is copied. In this case, for example, the set of pieces of valid data is copied to the respective physical storage locations of some non-defective physical blocks ahead of a defective physical block and to the respective physical storage locations of some non-defective physical blocks behind the defective physical block, so that the set of pieces of valid data is divided into two data portions corresponding to discontinuous two physical storage regions.

In this case, generally, the copy control unit 23 needs to notify the host 2 of physical address information for two sets corresponding one-to-one to the discontinuous two physical storage regions. In addition, in a case where the set of pieces of valid data is copied to discontinuous three physical storage regions in the copy destination superblock because of the presence of some defective physical blocks, the copy control unit 23 needs to notify the host 2 of physical address information for three sets corresponding one-to-one to the discontinuous three physical storage regions. Thus, in a configuration in which the set of pieces of valid data is copied to each non-defective physical block, except any defective physical block, belonging to the copy destination superblock in units of the predetermined data sizes like page sizes, the amount of information necessary for notifying the host 2 of the copy destination physical storage location of the valid data, tends to increase.

Therefore, instead of notifying the host 2 of physical address information for a plurality of sets corresponding one-to-one to a plurality of physical storage regions that is discontinuous, the copy control unit 23 notifies the host 2 of the identifier (e.g., LBAs) of each piece of valid data copied, the length of the set of pieces of valid data, a top copy destination physical address to which the set of pieces of valid data is copied, and a defect bitmap corresponding to the copy destination superblock.

The defect bitmap includes a plurality of bits corresponding one-to-one to the plurality of physical blocks belonging to the copy destination superblock. The value of each bit indicates whether or not the corresponding physical block is a defective physical block.

The top copy destination physical address to which the set of pieces of valid data is copied is expressed by the address of the copy destination superblock and the offset indicating the top copy destination physical storage location in the copy destination superblock to which the set of pieces of valid data is copied.

The offset indicates the offset from the first physical storage location to the top copy destination physical storage location of the copy destination superblock, namely, the offset of the top copy destination physical storage location to the first physical storage location of the copy destination superblock. The size of the offset from the first physical storage location to the top copy destination location of the copy destination superblock, may be expressed by a multiple of the granularity.

The NAND interface 13 is a memory control circuit that controls the NAND flash memory 5 under the control of the CPU 12.

The DRAM interface 14 is a DRAM control circuit that controls the DRAM 6 under the control of the CPU 12. The storage region of the DRAM 6 is used for storing a block management table 32. The block management table 32 includes a plurality of management tables corresponding one-to-one to the plurality of superblocks in the NAND flash memory 5. Each management table is used for storing management information (metadata) for management of the superblock corresponding to the management table. The metadata may include, but is not limited to, defective information indicating each defective physical block included in the superblock, the number of times of rewriting (number of program/erase cycles), and the open/closed state. The defective information corresponding to a superblock, is a defect bitmap including a plurality of bits corresponding one-to-one to the plurality of physical blocks included in the superblock. The open/closed state indicates whether the superblock is open or closed. The open state indicates that the superblock is in use as the write destination superblock. The closed state indicates that the superblock filled with data is managed as an active superblock.

Under the control of the CPU 12, the DMAC 15 executes data transfer between a memory (write buffer) in the host 2 and the DRAM 6 (internal buffer). In a case where the write data is to be transferred from the write buffer of the host 2 to the internal buffer, the CPU 12 specifies the transfer source address indicating the location on the write buffer, the data size, and the transfer destination address indicating the location on the internal buffer, to the DMAC 15.

When data is to be written into the NAND flash memory 5, the ECC encoder/decoder unit 16 encodes the write data to be written (ECC encoding), to add an error correction code (ECC) to the data. When data is read from the NAND flash memory 5, the ECC encoder/decoder unit 16 executes, with the ECC added to the read data, error correction to the data (ECC decoding).

FIG. 6 illustrates an exemplary superblock including a defective physical block.

For the sake of simplification of illustration, FIG. 6 exemplifies a superblock SB100 having eight physical blocks (physical block BLK100 included in the plane #0 of the die #0, physical block BLK100 included in the plane #1 of the die #0, physical block BLK100 included in the plane #0 of the die #1, physical block BLK100 included in the plane #1 of the die #1, physical block BLK100 included in the plane #0 of the die #2, physical block BLK100 included in the plane #1 of the die #2, physical block BLK100 included in the plane #0 of the die #3, and physical block BLK100 included in the plane #1 of the die #3).

In FIG. 6, a defective physical block is indicated with a cross mark and an available non-defective physical block is indicated with a circle mark in the eight physical blocks. In a case where the physical block BLK100 of the plane #1 of the die #1 is a defective physical block and the other seven physical blocks each are a non-defective physical block in the superblock SB100, the defect bitmap corresponding to the superblock SB100 indicates "11101111". In the defect bitmap "11101111", the first bit location corresponds to the first physical block in the superblock SB100 (physical block BLK100 included the plane #0 of the die #0), the second bit location corresponds to the second physical block in the superblock SB100 (physical block BLK100 included the plane #1 of the die #0), and similarly the eighth bit location corresponds to the eighth physical block in the superblock SB100 (physical block BLK100 included in the plane #1 of the die #3).

The value of each bit in the defect bitmap indicates whether or not the physical block corresponding to the bit location is a defective physical block. For example, "1" at a bit location indicates that the physical block corresponding to the bit location is a non-defective physical block, and "0" at a bit location indicates that the physical block corresponding to the bit location is a defective physical block.

Figure 7:
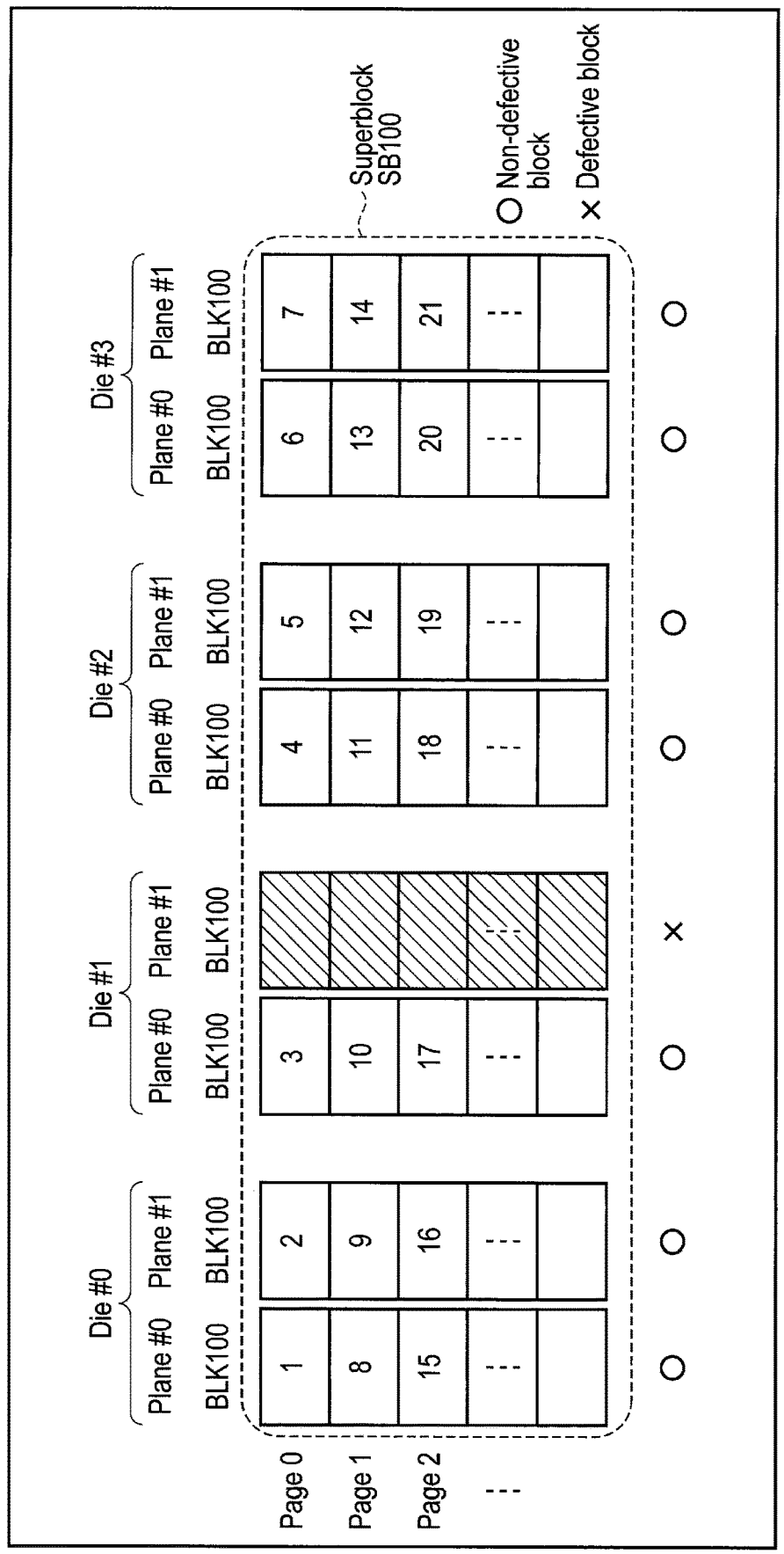
FIG. 7 is a diagram illustrating the write order for writing data into each non-defective physical block belonging to the block group such that writing to the defective physical block belonging to the block group is skipped.

FIG. 7 illustrates the write order for writing data into each non-defective physical block belonging to the superblock SB100 such that writing to the defective physical block belonging to the superblock SB100 is skipped.

A write operation to the eight physical blocks of the superblock SB100 is executed by interleaving, in which writing to the defective physical block BLK100 of the plane #1 of the die #1 is skipped and the write operation is executed to all the remaining non-defective physical blocks in units of predetermined data sizes like page sizes. That is the write data is written in parallel into some non-defective physical blocks in units of the predetermined data sizes like page sizes. The write operation is executed in ascending order of die identifiers (die addresses) and plane identifiers (plane addresses).

For example, in a case where the page size is 16K bytes, data may be written in the following order.

(1) The first 16K-byte data is written into page 0 of the physical block BLK100 of the plane #0 of the die #0.

(2) The second 16K-byte data is written into page 0 of the physical block BLK100 of the plane #1 of the die #0.
(3) The third 16K-byte data is written into page 0 of the physical block BLK100 of the plane #0 of the die #1.
(4) Writing to the defective physical block BLK100 of the plane #1 of the die #1 is skipped. Therefore, the fourth 16K-byte data is written into page 0 of the physical block BLK100 of the plane #0 of the die #2.
(5) The fifth 16K-byte data is written into page 0 of the physical block BLK100 of the plane #1 of the die #2.
(6) The sixth 16K-byte data is written into page 0 of the physical block BLK100 of the plane #0 of the die #3.
(7) The seventh 16K-byte data is written into page 0 of the physical block BLK100 of the plane #1 of the die #3.
(8) The eighth 16K-byte data is written into page 1 of the physical block BLK100 of the plane #0 of the die #0.
(9) The ninth 16K-byte data is written into page 1 of the physical block BLK100 of the plane #1 of the die #0.
(10) The tenth 16K-byte data is written into page 1 of the physical block BLK100 of the plane #0 of the die #1.
(11) Writing to the defective physical block BLK100 of the plane #1 of the die #1 is skipped. Therefore, the eleventh 16K-byte data is written into page 1 of the physical block BLK100 of the plane #0 of the die #2.
(12) The twelfth 16K-byte data is written into page 1 of the physical block BLK100 of the plane #1 of the die #2.
(13) The thirteenth 16K-byte data is written into page 1 of the physical block BLK100 of the plane #0 of the die #3.
(14) The fourteenth 16K-byte data is written into page 1 of the physical block BLK100 of the plane #1 of the die #3.

FIG. 8 illustrates exemplary respective physical addresses allocated to the physical storage locations in the superblock SB100 of FIG. 7.

As described above, the offset from the first physical storage location of the superblock SB100 to each physical storage location in the superblock SB100, may be expressed by a multiple of the granularity. The size of granularity may be identical to the page size or may be smaller than the page size. For example, in a case where the page size is 16K bytes, the size of granularity may be 16K bytes or may be 4K bytes. FIG. 8 exemplifies the offset from the first physical storage location to each physical storage location of the superblock SB100, expressed by a multiple of a granularity of 16K bytes. A physical storage location in the superblock SB100 is expressed by the address (SB100) identifying the superblock SB100 and the offset indicating the physical storage location in the superblock SB100.

For example, the physical address indicating the physical storage location corresponding to page 0 of the physical block BLK100 of the plane #0 of the die #0 is expressed by SB100 and offset 0. The physical address indicating the physical storage location corresponding to page 0 of the physical block BLK100 of the plane #1 of the die #0 is expressed by SB100 and offset 1. The physical address indicating the physical storage location corresponding to page 0 of the physical block BLK100 of the plane #0 of the die #1 is expressed by SB100 and offset 2. The physical address indicating the physical storage location corresponding to page 0 of the physical block BLK100 of the plane #1 of the die #1 is expressed by SB100 and offset 3.

Similarly, the physical address indicating the physical storage location corresponding to page 0 of the physical block BLK100 of the plane #0 of the die #2 is expressed by SB100 and offset 4. The physical address indicating the physical storage location corresponding to page 0 of the physical block BLK100 of the plane #1 of the die #2 is expressed by SB100 and offset 5. The physical address indicating the physical storage location corresponding to page 0 of the physical block BLK100 of the plane #0 of the die #3 is expressed by SB100 and offset 6. The physical address indicating the physical storage location corresponding to page 0 of the physical block BLK100 of the plane #1 of the die #3 is expressed by SB100 and offset 7.

Figure 9:
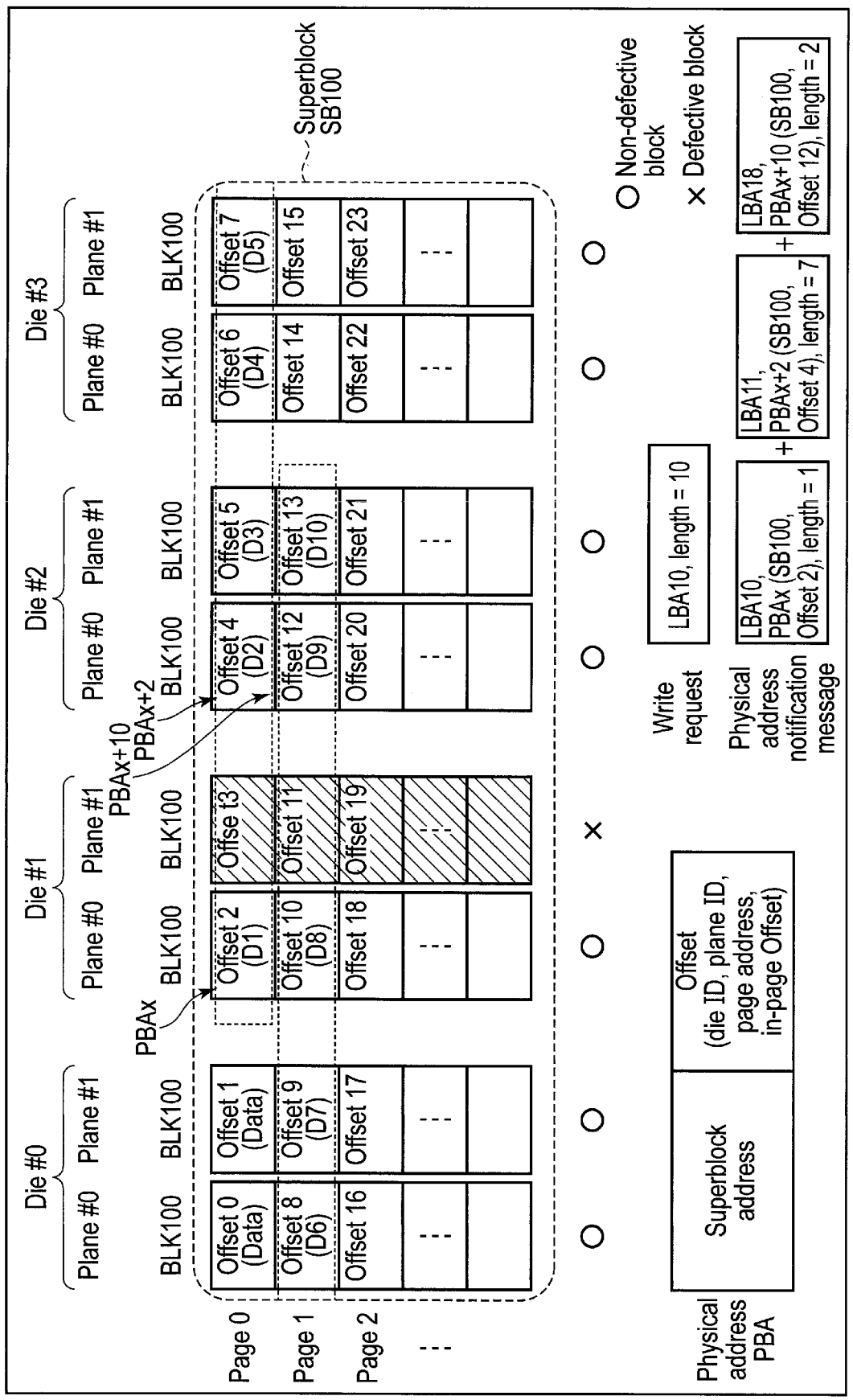
FIG. 9 is a diagram illustrating a comparative exemplary physical address notification message to be sent to the host in a case where data is written in some non-defective physical blocks between which the defective physical block is interposed.

FIG. 9 illustrates a comparative exemplary physical address notification message to be sent to the host 2 in a case where data is written in some non-defective physical blocks between which a defective physical block is interposed.

Here, it is assumed that a write request specifying LBA=10 and length=10 is received from the host 2, in a state in which data are already written in the first two physical storage locations of the superblock SB100. In addition, here, it is assumed that the minimum unit of addressing with the LBA specified by the host 2 is 16K bytes and the length of the write data (number of LBAs) is expressed by a multiple of a granularity of 16K bytes.

The top write destination physical storage location into which the write data is to be written, is the third physical storage location in the superblock SB100. The write data (D1 to D10) is written into from the third physical storage location (offset 2) in the superblock SB100 to the fourteenth physical storage location (offset 13) in the superblock SB100 such that writing to the defective physical block BLK100 of the plane #1 of the die #1 is skipped.

Therefore, the write data is divided into three data portions corresponding to discontinuous three physical storage regions (data portion D1, data portion D2 to D8, and data portion D9 and D10). In this case, for the comparative example, three pieces of physical address information corresponding to the three data portions need to be sent to the host 2.

The physical address information corresponding to the first data portion D1 includes LBA10, PBAx (SB100, offset 2), and length=1. PBAx (SB100, offset 2) represents the physical address indicating page 0 of the physical block BLK100 of the plane #0 of the die #1.

The physical address information corresponding to the next data portion D2 to D8 includes LBA11, PBAx+2 (SB100, offset 4), and length=7. PBAx+2 (SB100, offset 4) represents the physical address indicating page 0 of the physical block BLK100 of the plane #0 of the die #2.

The physical address information corresponding to the next data portion D9 and D10 includes LBA18, PBAx+10 (SB100, offset 12), and length=2. PBAx+10 (SB100, offset 12) represents the physical address indicating page 1 of the physical block BLK100 of the plane #0 of the die #2.

Therefore, for the comparative example, a large amount of information is required for notifying the host 2 of the write destination physical storage location of the write data.

Figure 10:
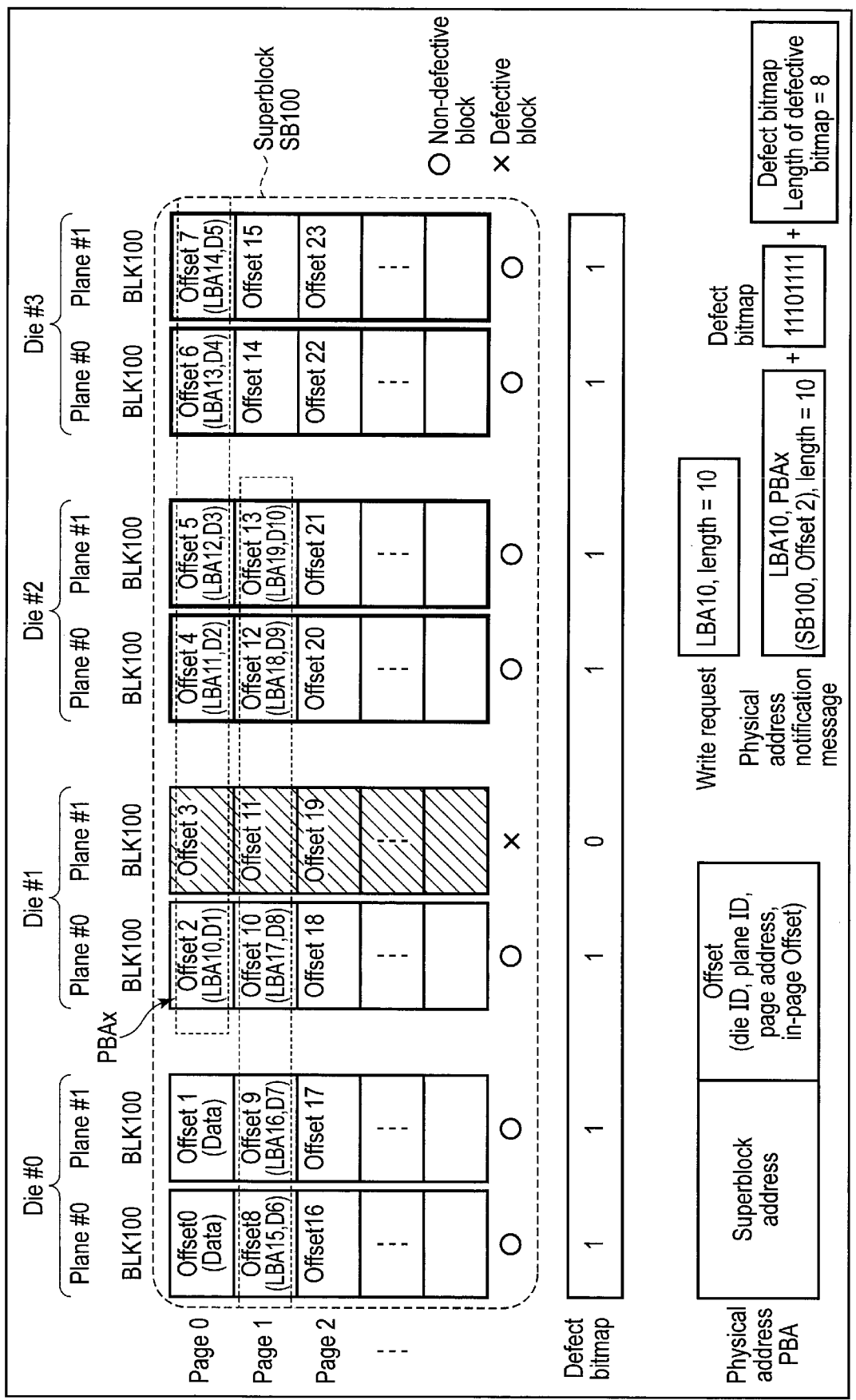
FIG. 10 is a diagram illustrating an exemplary physical address notification message that the memory system according to the embodiment sends to the host.

FIG. 10 illustrates an exemplary physical address notification message that the controller 4 of the flash storage device 3 sends to the host 2.

Here, similarly to FIG. 9, it is assumed that a write request specifying LBA=10 and length=10 is received from the host 2, with data already written in the first two physical storage locations of the superblock SB100. For length, for example, the length of the write data is expressed by a multiple of a granularity of 16K bytes.

The controller 4 writes the first 16K-byte data portion D1 included in the write data, into page 0 of the physical block BLK100 of the plane #0 of the die #1. The controller 4 skips writing to the physical block BLK100 of the plane #1 of the die #1 and then writes the next 16K-byte data portion D2 included in the write data, into page 0 of the physical block BLK100 of the plane #0 of the die #2. The controller 4 further writes the next 16K-byte data portion D3 included in the write data, into page 0 of the physical block BLK100 of the plane #1 of the die #2. The controller 4 further writes the next 16K-byte data portion D4 included in the write data, into page 0 of the physical block BLK100 of the plane #0 of the die #3. The controller 4 further writes the next 16K-byte data portion D5 included in the write data, into page 0 of the physical block BLK100 of the plane #1 of the die #3.

The controller 4 further writes the next 16K-byte data portion D6 included in the write data, into page 1 of the physical block BLK100 of the plane #0 of the die #0. The controller 4 further writes the next 16K-byte data portion D7 included in the write data, into page 1 of the physical block BLK100 of the plane #1 of the die #0. The controller 4 further writes the next 16K-byte data portion D8 included in the write data, into page 1 of the physical block BLK100 of the plane #0 of the die #1. The controller 4 skips writing to the physical block BLK100 of the plane #1 of the die #1 and then further writes the next 16K-byte data portion D9 included in the write data, into page 1 of the physical block BLK100 of the plane #0 of the die #2. The controller 4 further writes the next 16K-byte data portion D10 included in the write data, into page 1 of the physical block BLK100 of the plane #1 of the die #2.

Note that the controller 4 can write a pair of a data portion and the identifier (e.g., LBA) identifying the data portion every write destination physical storage location in the superblock SB100.

In this case, for example, a pair of LBA10 and the data portion D1 is written into the physical storage location (page 0 of the physical block BLK100 of the plane #0 of the die #1). A pair of LBA11 and the data portion D2 is written into the physical storage location (page 0 of the physical block BLK100 of the plane #0 of the die #2). Similarly, a pair of LBA19 and the data portion D10 is written into the physical storage location (page 1 of the physical block BLK100 of the plane #1 of the die #2).

In a case where the physical address notification message indicating the physical address in which the write data is written, is to be sent to the host 2, the controller 4 notifies the host 2 of the identifier (LBA10) of the write data, the top write destination physical address PBAx in which the write data is written, the length of the write data, the defect bitmap corresponding to the write destination superblock in which the write data is written, and the length of the defect bitmap, as the physical address notification message.

In the case of FIG. 10, the top write destination physical storage location in the superblock SB100 in which the write data is written, is the physical storage location indicated with offset 2. The top write destination physical address PBAx is expressed by SB100 and offset 2. Therefore, the controller 4 transmits, to the host 2, the physical address notification message including LBA10, the top write destination physical address PBAx (SB100, offset 2), length=10, the defect bitmap (11101111), and length of the defect bitmap=8. The length of the defect bitmap indicates the number of bits included in the defect bitmap, namely, the number of physical blocks included in the superblock SB100. In a case where the controller 4 has notified in advance the host 2 of the number of physical blocks included in each superblock, the controller 4 may transmit the physical address notification message excluding the length of the defect bitmap, to the host 2.

Based on the physical address notification message received from the controller 4, the host 2 can specify the respective physical storage locations in which the data portions D1 to D10 of the write data are written in practice, in the superblock SB100.

Figure 11:
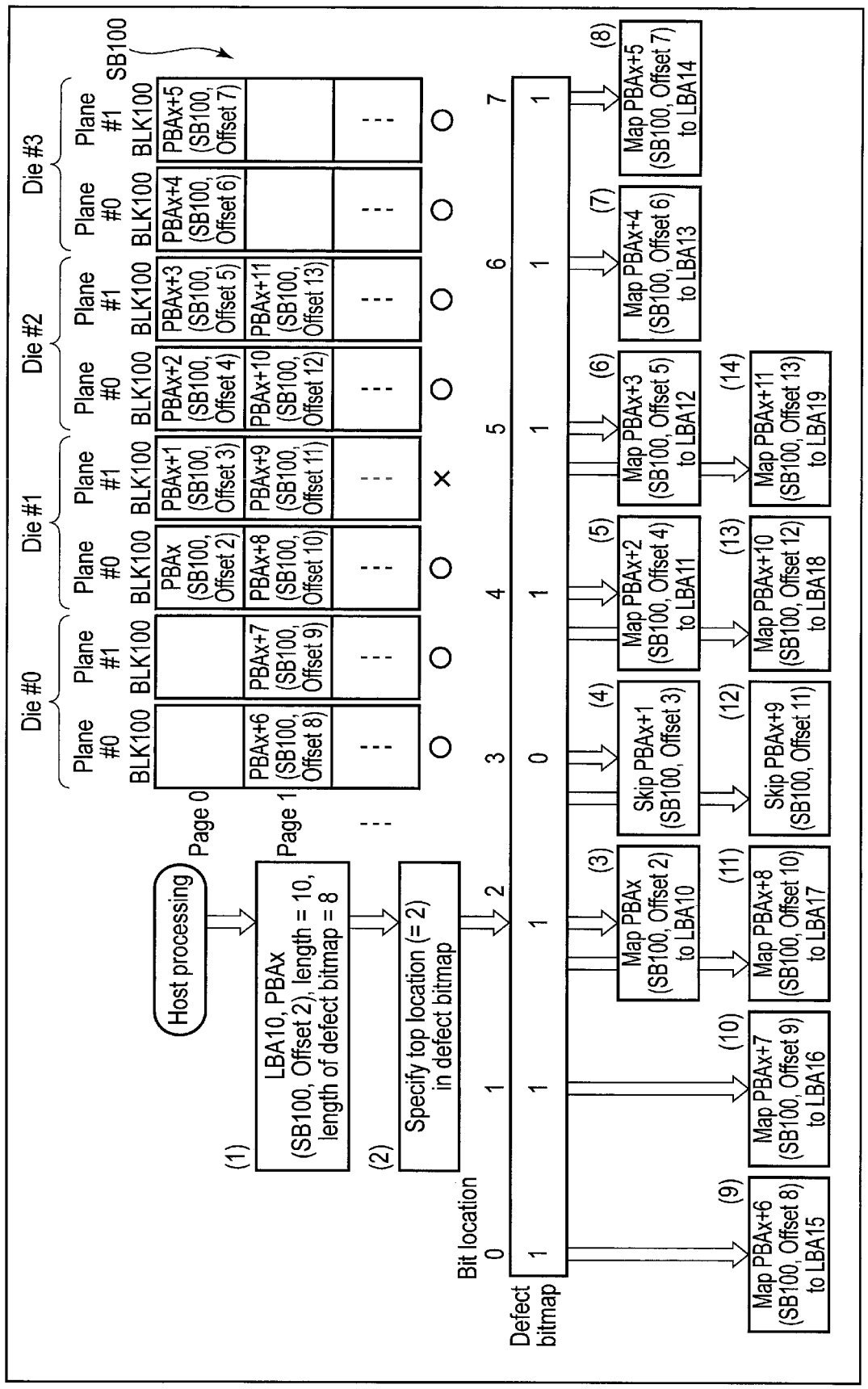
FIG. 11 is a diagram illustrating exemplary address mapping processing that the host executes.

FIG. 11 illustrates exemplary address mapping processing that the host 2 executes.

(1) The host 2 receives, from the controller 4, the physical address notification message including LBA10, the top write destination physical address PBAx (SB100, offset 2), length=10, the defect bitmap, and length of the defect bitmap=8.

(2) The host 2 specifies the top bit location (=2) to be referenced in the defect bitmap, based on a remainder of 2 resulting from offset 2 divided by 8 that is the length of the defect bitmap.

Figure 12:
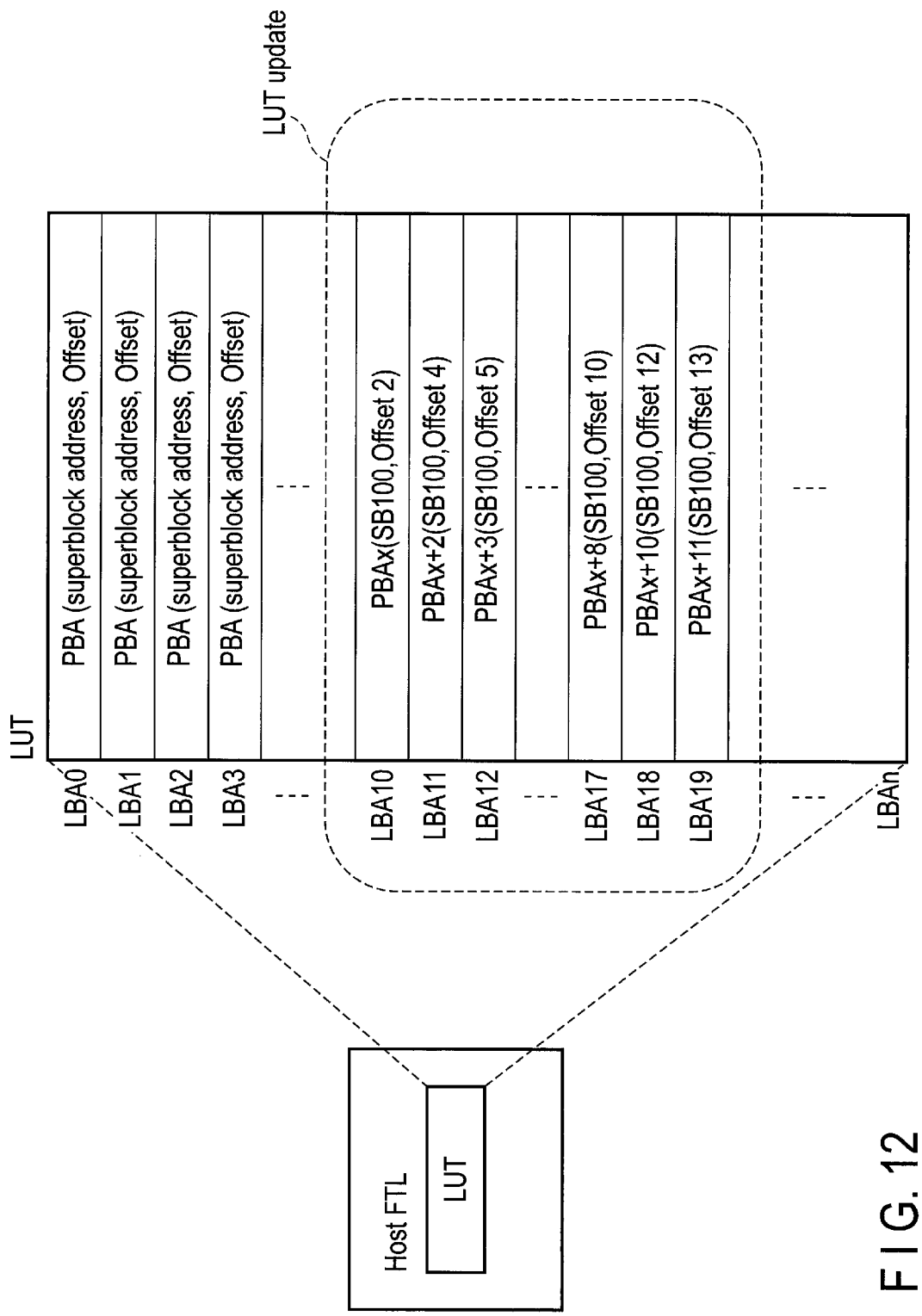
FIG. 12 is a diagram illustrating exemplary LUT update processing that the host executes, based on the physical address notification message of FIG. 10.

(3) Because the bit of the bit location (=2) in the defect bitmap is "1", the host 2 can recognize that the data portion D1 corresponding to LBA10 is written in the top write destination physical address PBAx (SB100, offset 2). Thus, as illustrated in FIG. 12, the host 2 updates the LUT of the host FTL such that PBAx (SB100, offset 2) is mapped to LBA10.

(4) Because the bit of the next bit location (=3) in the defect bitmap is "0", the host 2 skips mapping of the next physical address PBAx+1 (SB100, offset 3).

(5) Because the bit of the next bit location (=4) in the defect bitmap is "1", the host 2 can recognize that the data portion D2 corresponding to LBA11 is written in the physical address PBAx+2 (SB100, offset 4). Thus, as illustrated in FIG. 12, the host 2 updates the LUT of the host FTL such that PBAx+2 (SB100, offset 4) is mapped to LBA11.

(6) Because the bit of the next bit location (=5) in the defect bitmap is "1", the host 2 can recognize that the data portion D3 corresponding to LBA12 is written in the physical address PBAx+3 (SB100, offset 5). Thus, as illustrated in FIG. 12, the host 2 updates the LUT of the host FTL such that PBAx+3 (SB100, offset 5) is mapped to LBA12.

(7) Because the bit of the next bit location (=6) in the defect bitmap is "1", the host 2 can recognize that the data portion D4 corresponding to LBA13 is written in the physical address PBAx+4 (SB100, offset 6). Thus, as illustrated in FIG. 12, the host 2 updates the LUT of the host FTL such that PBAx+4 (SB100, offset 6) is mapped to LBA13.

(8) Because the bit of the next bit location (=7) in the defect bitmap is "1", the host 2 can recognize that the data portion D5 corresponding to LBA14 is written in the physical address PBAx+5 (SB100, offset 7). Thus, as illustrated in FIG. 12, the host 2 updates the LUT of the host FTL such that PBAx+5 (SB100, offset 7) is mapped to LBA14.

(9) The host 2 returns the bit location to be referenced in the defect bitmap, to the first bit location (=0). Because the bit of the first bit location (=0) in the defect bitmap is "1", the host 2 can recognize that the data portion D6 corresponding to LBA15 is written in the physical address PBAx+6 (SB100, offset 8). Thus, as illustrated in FIG. 12, the host 2 updates the LUT of the host FTL such that PBAx+6 (SB100, offset 8) is mapped to LBA15.

(10) Because the bit of the next bit location (=1) in the defect bitmap is "1", the host 2 can recognize that the data portion D7 corresponding to LBA16 is written in the physical address PBAx+7 (SB100, offset 9). Thus, as illustrated in FIG. 12, the host 2 updates the LUT of the host FTL such that PBAx+7 (SB100, offset 9) is mapped to LBA16.

(11) Because the bit of the next bit location (=1) in the defect bitmap is "1", the host 2 can recognize that the data portion D8 corresponding to LBA17 is written in the physical address PBAx+8 (SB100, offset 10). Thus, as illustrated in FIG. 12, the host 2 updates the LUT of the host FTL such that PBAx+8 (SB100, offset 10) is mapped to LBA17.

(12) Because the bit of the next bit location (=3) in the defect bitmap is "0", the host 2 skips mapping of the physical address PBAx+9 (SB100, offset 11).

(13) Because the bit of the next bit location (=4) in the defect bitmap is "1", the host 2 can recognize that the data portion D9 corresponding to LBA18 is written in the physical address PBAx+10 (SB100, offset 12). Thus, as illustrated in FIG. 12, the host 2 updates the LUT of the host FTL such that PBAx+10 (SB100, offset 12) is mapped to LBA18.

(14) Because the bit of the next bit location (=5) in the defect bitmap is "1", the host 2 can recognize that the data portion D10 corresponding to LBA19 is written in the physical address PBAx+11 (SB100, offset 13). Thus, as illustrated in FIG. 12, the host 2 updates the LUT of the host FTL such that PBAx+11 (SB100, offset 13) is mapped to LBA19.

Figure 13:
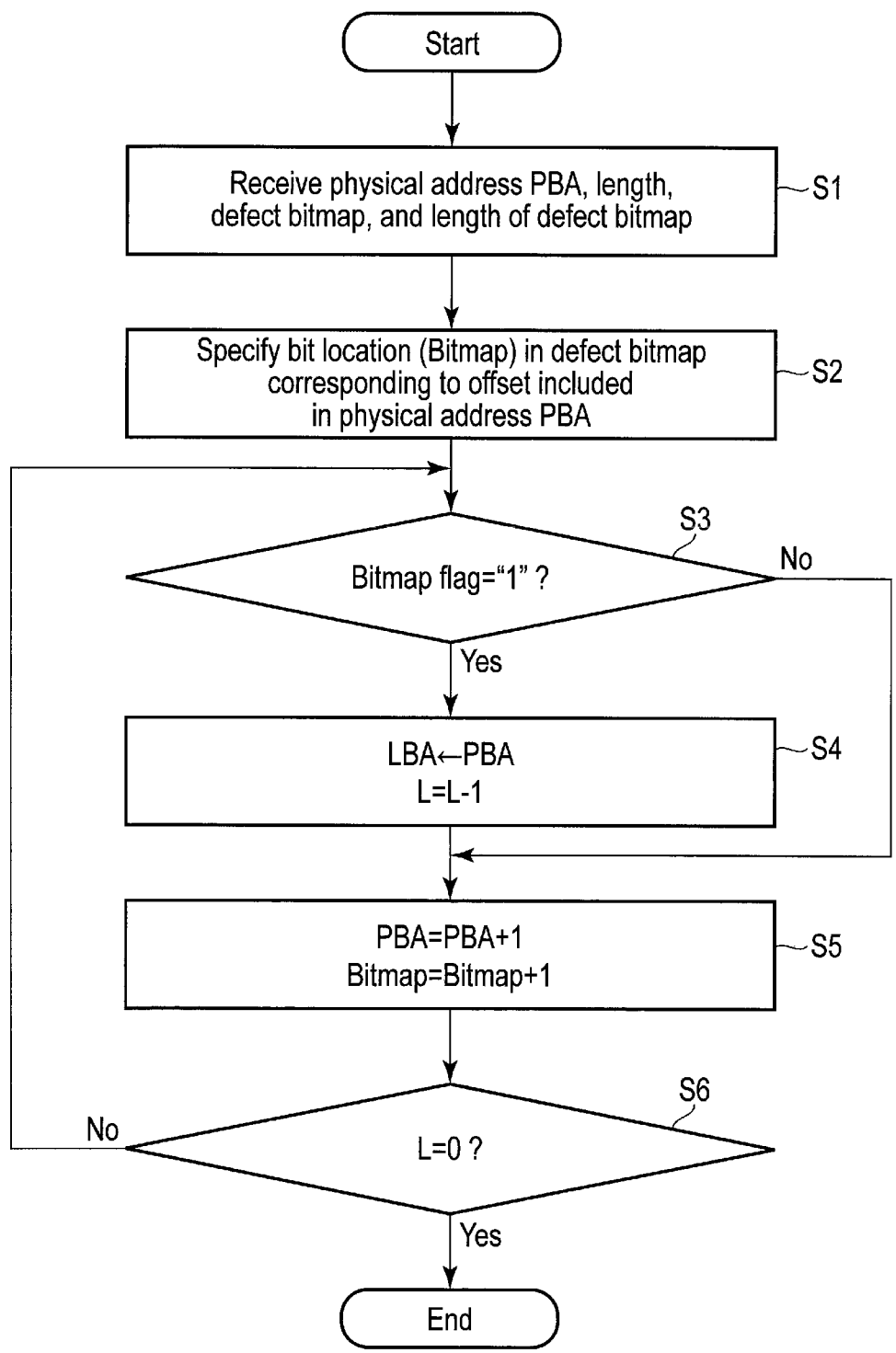
FIG. 13 is a flowchart illustrating the procedure of the address mapping processing that the host executes.

FIG. 13 is a flowchart illustrating the procedure of the address mapping processing that the host 2 executes.

The host 2 receives, from the controller 4, the physical address notification message including the top write destination physical address PBA (superblock address, offset), the length of the write data, the defect bitmap, the length of the defect bitmap (step S1). The host 2 specifies the bit location ("Bitmap") corresponding to the top write destination physical address PBA, in the defect bitmap, namely, the bit to be referenced in the defect bitmap (step S2). At step S2, the host 2 obtains a remainder resulting from the value of the offset included in the PBA, divided by the length of the defect bitmap, and then specifies the bit of the bit location corresponding to the remainder as the bit location "Bitmap" to be referenced.

The host 2 determines whether or not the bit of the bit location "Bitmap" to be referenced is "1" (step S3).

In a case where the bit of the bit location "Bitmap" to be referenced is "1" (YES at step S3), the host 2 maps the current physical address PBA (superblock address, offset) to the LBA of the write data, and additionally decrements the value of variable L indicating the length of the write data by 1 (step S4). Then, the host 2 updates the current physical address PBA to PBA+1, and further updates the value of the current bit location "Bitmap" to be referenced, to Bitmap+1 (step S5).

Meanwhile, in a case where the bit of the bit location "Bitmap" to be referenced is "0" (NO at step S3), the host 2 executes the processing at step S5 without executing the processing at step S4.

The host 2 determines whether or not the value of variable L is 0 (step S6). Until the value of variable L becomes 0, the processing at steps S3 to S5 is repeatedly executed.

FIG. 14 illustrates exemplary mapping of the physical address to each superblock in a case where the granularity is set at 4K bytes.

For the sake of simplification of illustration, FIG. 14 exemplifies the superblock SB100 having four physical blocks (physical block BLK100 included in the plane #0 of the die #0, physical block BLK100 included in the plane #1 of the die #0, physical block BLK100 included in the plane #0 of the die #1, and physical block BLK100 included in the plane #1 of the die #1). A defective physical block is indicated with a cross mark and a non-defective physical block is indicated with a circle mark in the four physical blocks.

The physical storage locations of the superblock SB100 are managed in units of 4K bytes. The offset from the first physical storage location of the superblock SB100 to each physical storage location in the superblock SB100, is expressed by a multiple of a granularity of 4K bytes.

Offsets 0 to 3 are allocated to four 4K-byte regions included in page 0 of the physical block BLK100 of the plane #0 of the die #0. Offsets 4 to 7 are allocated to four 4K-byte regions included in page 0 of the physical block BLK100 of the plane #1 of the die #0. Offsets 8 to 11 are allocated to four 4K-byte regions included in page 0 of the physical block BLK100 of the plane #0 of the die #1. Offsets 12 to 15 are allocated to four 4K-byte regions included in page 0 of the physical block BLK100 of the plane #1 of the die #1.

Offsets 16 to 19 are allocated to four 4K-byte regions included in page 1 of the physical block BLK100 of the plane #0 of the die #0. Offsets 20 to 23 are allocated to four 4K-byte regions included in page 1 of the physical block BLK100 of the plane #1 of the die #0. Offsets 24 to 27 are allocated to four 4K-byte regions included in page 1 of the physical block BLK100 of the plane #0 of the die #1. Offsets 28 to 31 are allocated to four 4K-byte regions included in page 1 of the physical block BLK100 of the plane #1 of the die #1.

Writing to the physical block BLK100 of the plane #0 of the die #1 is skipped. Therefore, writing of data is executed in the order of page 0 of the physical block BLK100 of the plane #0 of the die #0, page 0 of the physical block BLK100 of the plane #1 of the die #0, page 0 of the physical block BLK100 of the plane #1 of the die #1, page 1 of the physical block BLK100 of the plane #0 of the die #0, page 1 of the physical block BLK100 of the plane #1 of the die #0, page 1 of the physical block BLK100 of the plane #1 of the die #1, and so on.

Figure 15:
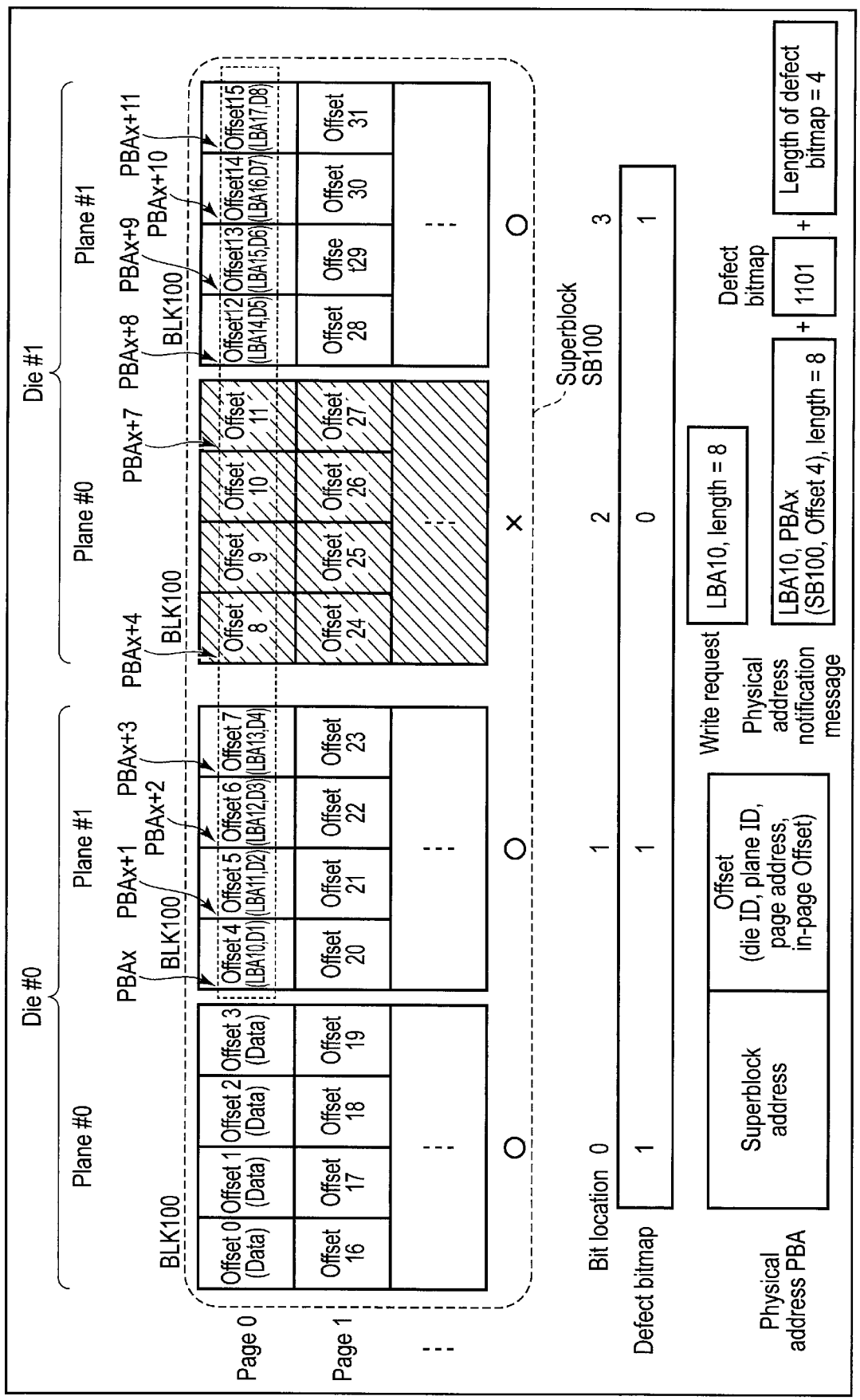
FIG. 15 is a diagram illustrating another exemplary physical address notification message that the memory system according to the embodiment sends to the host.

FIG. 15 illustrates an exemplary physical address notification message in a case where a granularity of 4K bytes is used. Here, it is assumed that the minimum unit of addressing with the LBA specified by host 2 is 4K bytes. In this case, the length of the write data (number of LBAs) is expressed by a multiple of 4K bytes.

In a case where a write request specifying LBA=10 and length=8 (here, 32K bytes) is received from the host 2, with data already written in page 0 of the physical block BLK100 of the plane #0 of the die #0, the controller 4 writes the first 16K-byte data portion (four 4K-byte data portions D1 to D4) included in the 32K-byte write data associated with the write request, into page 0 of the physical block BLK100 of the plane #1 of the die #0. The controller 4 skips writing to the physical block BLK100 of the plane #0 of the die #1, and writes the remaining 16K-byte data portion (four 4K-byte data portions D5 to D8) included in the write data, into page 0 of the physical block BLK100 of the plane #1 of the die #1.

Note that the controller 4 can write four LBAs (LBA10, LBA11, LBA12, and LBA13) corresponding to the four data portions (D1, D2, D3, and D4), into page 0 of the physical block BLK100 of the plane #1 of the die #0, together with the four data portions (D1, D2, D3, and D4).

In this case, a pair of LBA10 and the 4K-byte data portion D1, a pair of LBA11 and the 4K-byte data portion D2, a pair of LBA12 and the 4K-byte data portion D3, and a pair of LBA13 and the 4K-byte data portion D4 are written into the four physical storage locations (four sectors) in page 0 of the physical block BLK100 of the plane #1 of the die #0.

Similarly, the controller 4 can write four LBAs (LBA14, LBA15, LBA16, and LBA17) corresponding to the four data portions (D5, D6, D7, and D8), into page 0 of the physical block BLK100 of the plane #1 of the die #1, together with the four data portions (D5, D6, D7, and D8).

In this case, a pair of LBA14 and the 4K-byte data portion D5, a pair of LBA15 and the 4K-byte data portion D6, a pair of LBA16 and the 4K-byte data portion D7, and a pair of LBA17 and the 4K-byte data portion D8 are written into the four physical storage locations (four sectors) in page 0 of the physical block BLK100 of the plane #1 of the die #1.

In a case where the physical address notification message indicating the physical address in which the write data is written, is to be sent to the host 2, the controller 4 notifies the host 2 of the identifier (LBA10) of the write data, the top write destination physical address PBAx in which the write data is written, the length of the write data, the defect bitmap corresponding to the write destination superblock in which the write data is written, and the length of the defect bitmap, as the physical address notification message.

In the case of FIG. 15, the top write destination physical storage location PBAx in the superblock SB100 in which the write data is written, is the physical storage location indicated with offset 4. The top write destination physical storage location PBAx is expressed by SB100 and offset 4. Therefore, the controller 4 transmits, to the host 2, the physical address notification message including LBA10, PBAx (SB100, offset 4), length=8, the defect bitmap (1101), length of the defect bitmap=4. The length of the defect bitmap indicates the number of bits included in the defect bitmap, namely, the number of physical blocks included in the superblock SB100. In a case where the controller 4 has notified in advance the host 2 of the number of physical blocks included in each superblock, the controller 4 may transmit the physical address notification message excluding the length of the defect bitmap, to the host 2.

Based on the physical address notification message received from the controller 4, the host 2 can specify the respective physical storage locations in which the data portions D1 to D8 of the write data are written in practice, in the superblock SB100.

Because the number of physical storage locations (sectors) per page is four, the host 2 obtains a quotient of 1 resulting from offset 4 included in the top write destination physical storage location PBAx, divided by 4 that is the number of sectors per page, and then specifies the top bit location (=1) to be referenced in the defect bitmap, based on a remainder of 1 resulting from 1 that is the quotient, divided by 4 that is the length of the defect bitmap.

Figure 16:
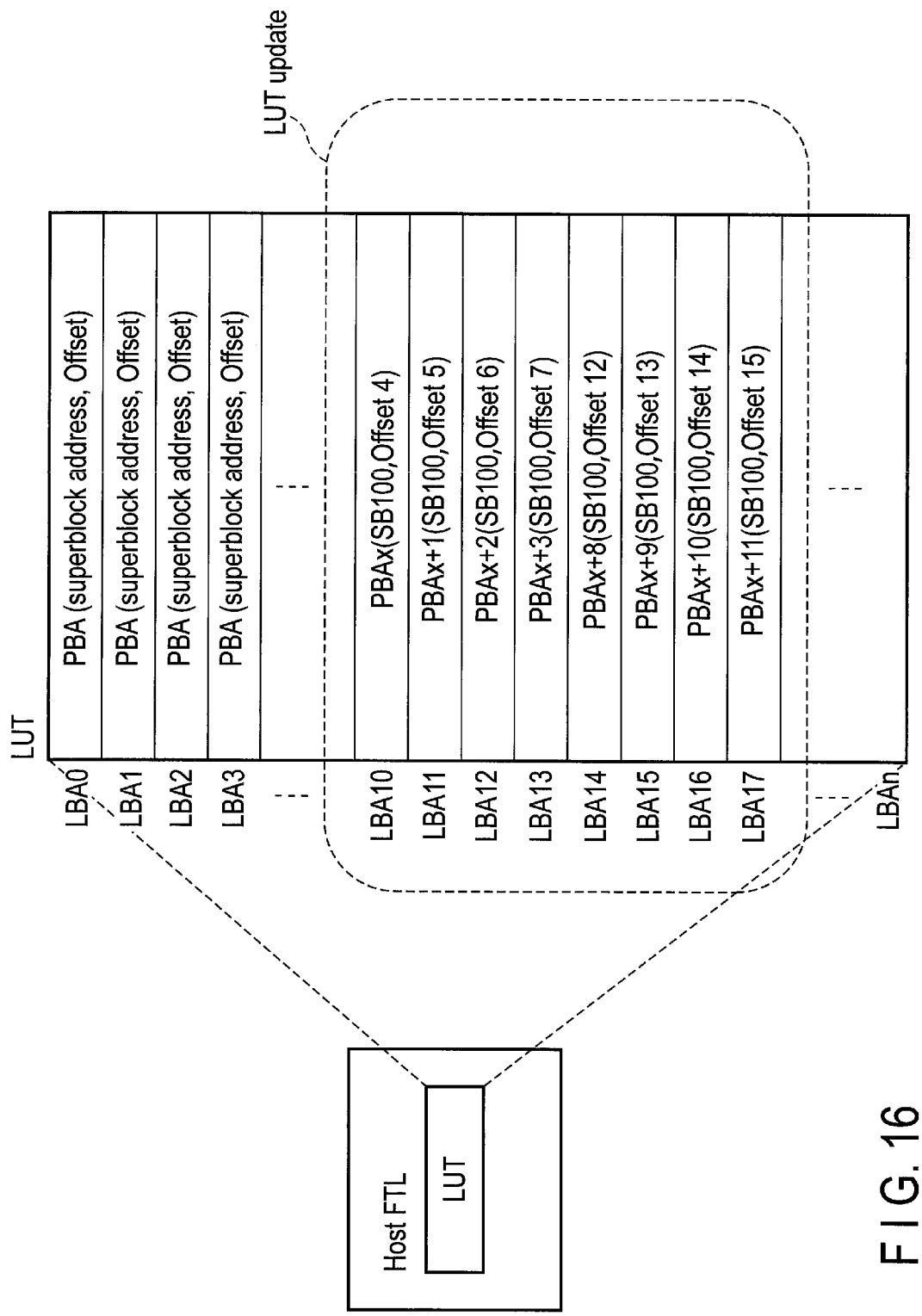
FIG. 16 is a diagram illustrating exemplary LUT update processing that the host executes, based on the physical address notification message of FIG. 15.

Because the bit of the bit location (=1) in the defect bitmap "1101" is "1", the host 2 can recognize that the data portion D1 corresponding to LBA10 is written in the physical address PBAx (SB100, offset 4). Thus, as illustrated in FIG. 16, the host 2 updates the LUT of the host FTL such that PBAx (SB100, offset 4) is mapped to LBA10.

Because the bit of the bit location (=1) corresponding to each of PBAx+1 to PBAx+3 in the defect bitmap "1101" is "1", the host 2 can recognize that the data portions D2 to D4 corresponding to LBA11 to LBA13 are written in the physical addresses PBAx+1 (SB100, offset 5) to PBAx+3 (SB100, offset 7). Thus, as illustrated in FIG. 16, the host 2 updates the LUT of the host FTL such that PBAx+1 (SB100, offset 5) to PBAx+3 (SB100, offset 7) are mapped to LBA1l to LBA13, respectively.

Because the bit of the bit location (=2) corresponding to each of PBAx+4 to PBAx+7 in the defect bitmap "1101" is "0", the host 2 skips mapping of PBAx+4 to PBAx+7.

Because the bit of the bit location (=3) corresponding to each of PBAx+8 to PBAx+11 in the defect bitmap "1101" is "1", the host 2 can recognize that the data portions D5 to D8 corresponding to LBA14 to LBA17 are written in the physical addresses PBAx+8 (SB100, offset 12) to PBAx+11 (SB100, offset 15). Thus, as illustrated in FIG. 16, the host 2 updates the LUT of the host FTL such that PBAx+8 (SB100, offset 12) to PBAx+11 (SB100, offset 15) are mapped to LBA14 to LBA17, respectively.

FIG. 17 illustrates a write command that the flash storage device 3 issues.

The write command requests the flash storage device 3 to write data. The write command may include command ID, tag, length, and write buffer address.

The command ID is the unique identifier of the command (here, the write command). The tag is an identifier for identifying the write data to be written. As described above, the tag may be a logical address like the LBA or may be a user address (e.g., a key in the key-value store or the hash value of the key).

The length indicates the length of the write data to be written. The length (data length) may be specified by the degree of granularity or by the number of LBAs.

The write buffer address indicates the location in which the write data to be written is stored, in the host memory (write buffer of the host 2). The write buffer address is also referenced as a data pointer.

FIG. 18 illustrates an address recording request that the flash storage device 3 sends to the host 2.

The address recording request is the physical address notification message and is used to notify the host 2 of the physical address indicating the storage location (physical storage location) in which the write data associated with the write command is written, in the NAND flash memory 5. The address recording request may include tag, physical address (superblock address, offset), length, defect bitmap, and length of the defect bitmap.

The tag is the tag included in the write command of FIG. 17. The physical address indicates the physical storage location in which the write data associated with the write command is written. The physical address is expressed by the superblock address and the offset. The superblock address is the address of the superblock in which the write data is written. The offset indicates the top physical storage location (top write destination physical storage location) in the superblock in which the write data is written. That is the offset indicates the first physical storage location in the superblock at the start of writing of the write data.

The length indicates the length of the write data written. The defect bitmap is defect identification information indicating whether each physical block belonging to the superblock in which the write data is written, is available. The defect bitmap includes a plurality of bits identical in number to the physical blocks belonging to the superblock. Each bit indicates whether the physical block corresponding to the bit is a defective physical block.

The length of the defect bitmap indicates the number of bits included in the defect bitmap. The number of bits indicates the number of physical blocks belonging to the corresponding superblock.

FIG. 19 illustrates a read command that the flash storage device 3 issues.

The read command requests the flash storage device 3 to read data. The read command may include command ID, physical address, length, and read buffer address.

The command ID is the unique identifier of the command (here, the read command). The physical address indicates the physical storage location in which the data to be read is stored. The physical address is expressed by the superblock address and the offset. The superblock address is the address of the superblock to be read. The offset indicates the physical storage location (top physical storage location) to be read in the superblock to be read. The top physical storage location is the physical storage location in which the first data portion that is part of the data to be read is stored. The length indicates the length of the data to be read. The read buffer address indicates the location to which the data read is to be transferred, in the host memory (read buffer of the host 2).

Figure 20:
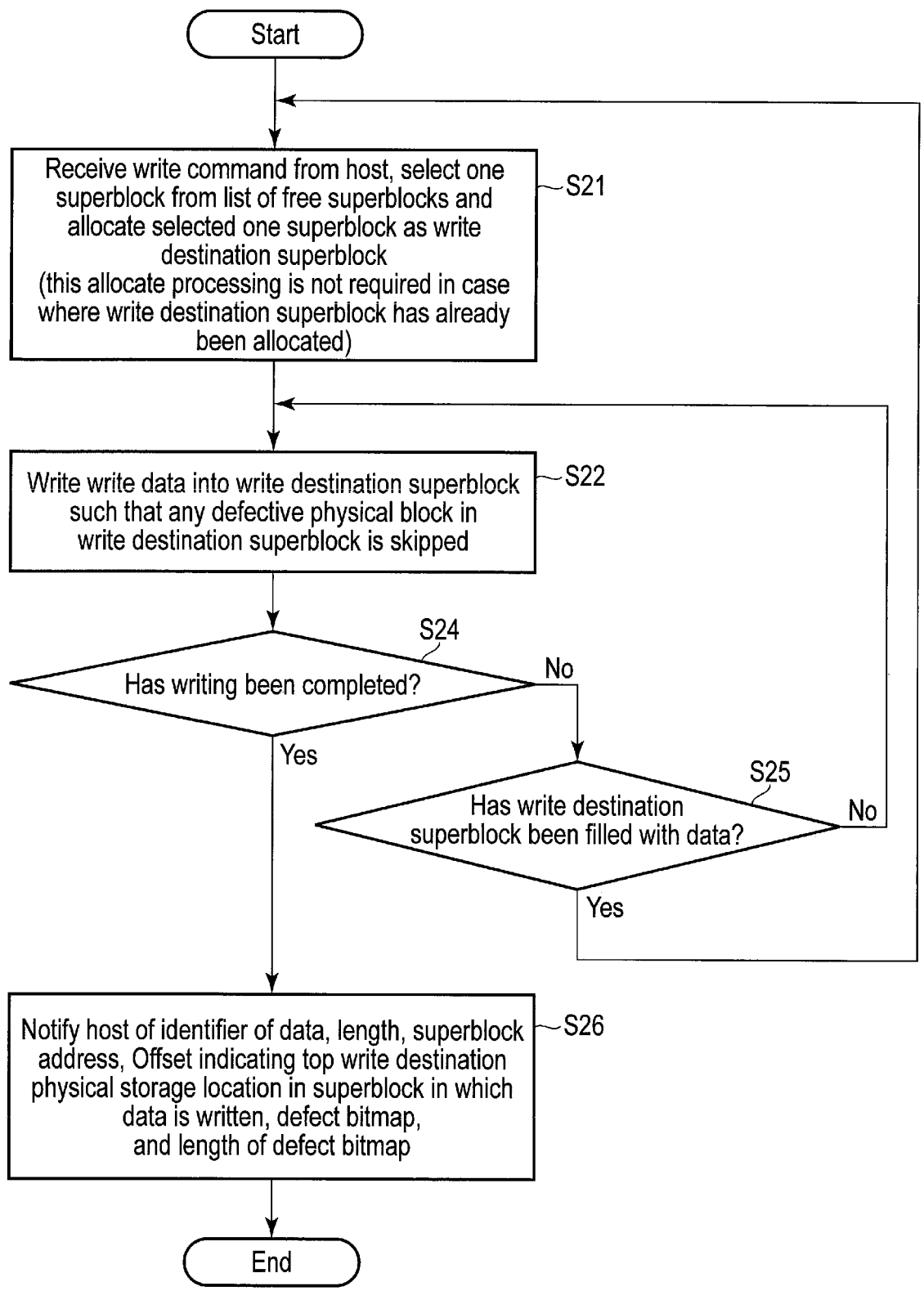
FIG. 20 is a flowchart illustrating the procedure of a write destination block allocation operation and a data write operation that the memory system according to the embodiment executes.

FIG. 20 is a flowchart illustrating the procedure of a write destination block allocation operation and a data write operation.

The controller 4 receives a write command from the host 2 (step S21). In the step S21, the controller 4 selects one superblock (free superblock) in a common flash block pool 602 that is a list of free superblocks. Then, the controller 4 allocates the selected superblock as the write destination superblock. As described above, if the write destination superblock has already been allocated, the allocation operation does not need to be executed.

With reference to the defect bitmap corresponding to the write destination superblock, the controller 4 writes the write data associated with the received write command, into each non-defective physical block belonging to the write destination superblock group, in units of predetermined data sizes like page sizes, such that writing to any defective physical block belonging to the write destination superblock is skipped (step S22).

When the entirety of the write destination superblock is filled by writing of part of the write data (NO at step S24 and YES at step S25), the controller 4 selects one superblock (free superblock) in the common flash block pool 602, and allocates the selected superblock as a new write destination superblock (step S21). Then, the controller 4 writes the remaining portion of the write data, into the new write destination superblock (step S22).

When writing of the entirety of the write data is completed (YES at step S24), the controller 4 notifies the host 2 of the address recording request including the identifier (e.g., LBA) of the write data, the length of the write data, the top physical address (superblock address of the write destination superblock and offset indicating the top write destination physical storage location in the write destination superblock in which the write data is written) in which the write data is written, the defect bitmap corresponding to the write destination superblock, and the length of the defect bitmap (step S26).

FIG. 21 illustrates a copy command that the flash storage device 3 issues.

The copy command requests the flash storage device 3 to copy data already written in the NAND flash memory 5, to another storage location in the NAND flash memory 5.

The copy command is used to copy each piece of valid data included in the copy source superblock specified by the host 2, to the copy destination superblock. The copy destination superblock may be specified by the host 2, but is not necessarily specified by the host 2. In a configuration in which no copy destination superblock is specified by the host 2, the copy destination superblock is determined by the controller 4 of the flash storage device 3.

The copy command may include command ID, source physical address, destination physical address, and valid bitmap.

The command ID is the unique identifier of the copy command. The source physical address indicates the address (superblock address) of the copy source superblock in which the data to be copied is stored. The destination physical address indicates the address (superblock address) of the copy destination superblock. As described above, the copy destination superblock may be determined by the controller 4. In this case, the copy command does not necessarily include the destination physical address.

The valid bitmap includes a plurality of bits corresponding one-to-one to the plurality of physical storage locations in the copy source superblock. The value of each bit indicates whether or not valid data is present in the corresponding physical storage location. In other words, the valid bitmap indicates whether each piece of data stored in the copy source superblock is valid data or invalid data.

Note that the valid bitmap may be notified from the host 2 to the controller 4, separately from the copy command. In this case, the copy command does not necessarily include the valid bitmap. It is assumed that the valid bitmap is included in the copy command, below.

In response to reception of the copy command including the source physical address and the valid bitmap from the host 2, the controller 4 copies a set of pieces of valid data in the copy source superblock, to each non-defective physical block belonging to the copy destination superblock, in units of predetermined data sizes like page sizes, such that copying of any valid data to any defective physical block belonging to the copy destination superblock group is skipped. Each piece of valid data in the copy source superblock is determined based on the valid bitmap.

FIG. 22 illustrates an address change request that the flash storage device 3 sends to the host 2.

The address change request is used to notify the host 2 of a new physical address of data copied. That is the address change request may include identifier (tag) of each piece of valid data copied, length, top copy source physical address (copy source superblock address, top copy source location (offset) in the copy source superblock), valid bitmap, top copy destination physical address (copy destination superblock address, top copy destination location (offset) in the copy destination superblock), defect bitmap, and length of the defect bitmap.

The length indicates the length of the set of pieces of valid data copied. The top copy source physical address indicates the copy source physical storage location in which the first valid data portion included in the set of pieces of valid data is stored. The top copy source physical address is expressed by the address (superblock address) of the copy source superblock and the offset indicating the top copy source physical storage location in the copy source superblock group in which the set of pieces of valid data is stored.

The top copy destination physical address indicates the copy destination physical storage location to which the first valid data portion included in the set of pieces of valid data is copied. The top copy destination physical address is expressed by the address of the copy destination superblock (superblock address) and the offset indicating the top copy destination physical storage location in the copy destination superblock to which the set of pieces of valid data is copied.

The defect bitmap is defect identification information indicating whether or not each physical block in the copy destination superblock is available. The defect bitmap includes a plurality of bits identical in number to the physical blocks belonging to the copy destination superblock. Each bit indicates whether or not the physical block corresponding to the bit is a defective physical block.

The length of the defect bitmap indicates the number of bits included in the defect bitmap. The number of bits indicates the number of physical blocks belonging to the copy destination superblock.

FIG. 23 illustrates an exemplary copy source superblock and an exemplary valid bitmap corresponding to the copy source superblock. For example, the minimum unit of addressing with the LBA specified by the host 2 may be 16K bytes, and the valid bitmap may include a plurality of bits corresponding one-to-one to a plurality of physical storage locations in the copy source superblock SB100 (here, a plurality of pages). Alternatively, the minimum unit of address specification with the LBA may be 4K bytes, and the valid bitmap may include a plurality of bits corresponding one-to-one to a plurality of 4K-byte physical storage locations in the copy source superblock SB100. FIG. 23 exemplifies the former case.

In the valid bitmap, the bit "1" indicates that valid data is stored in the corresponding physical storage location. The bit "0" indicates that no valid data is stored in the corresponding physical storage location.

In FIG. 23, data D3 (data stored in page 0 of the block BLK100 of the plane #0 of the die #1), data D5 (data stored in page 0 of the block BLK100 of the plane #1 of the die #2), data D9 (data stored in page 1 of the block BLK100 of the plane #1 of the die #0), data D10 (data stored in page 1 of the block BLK100 of the plane #0 of the die #1), data D18 (data stored in page 2 of the block BLK100 of the plane #0 of the die #2), data D20 (data stored in page 2 of the block BLK100 of the plane #0 of the die #3), and data D24 (data stored in page 3 of the block BLK100 of the plane #1 of the die #2) each are valid data.

Figure 24:
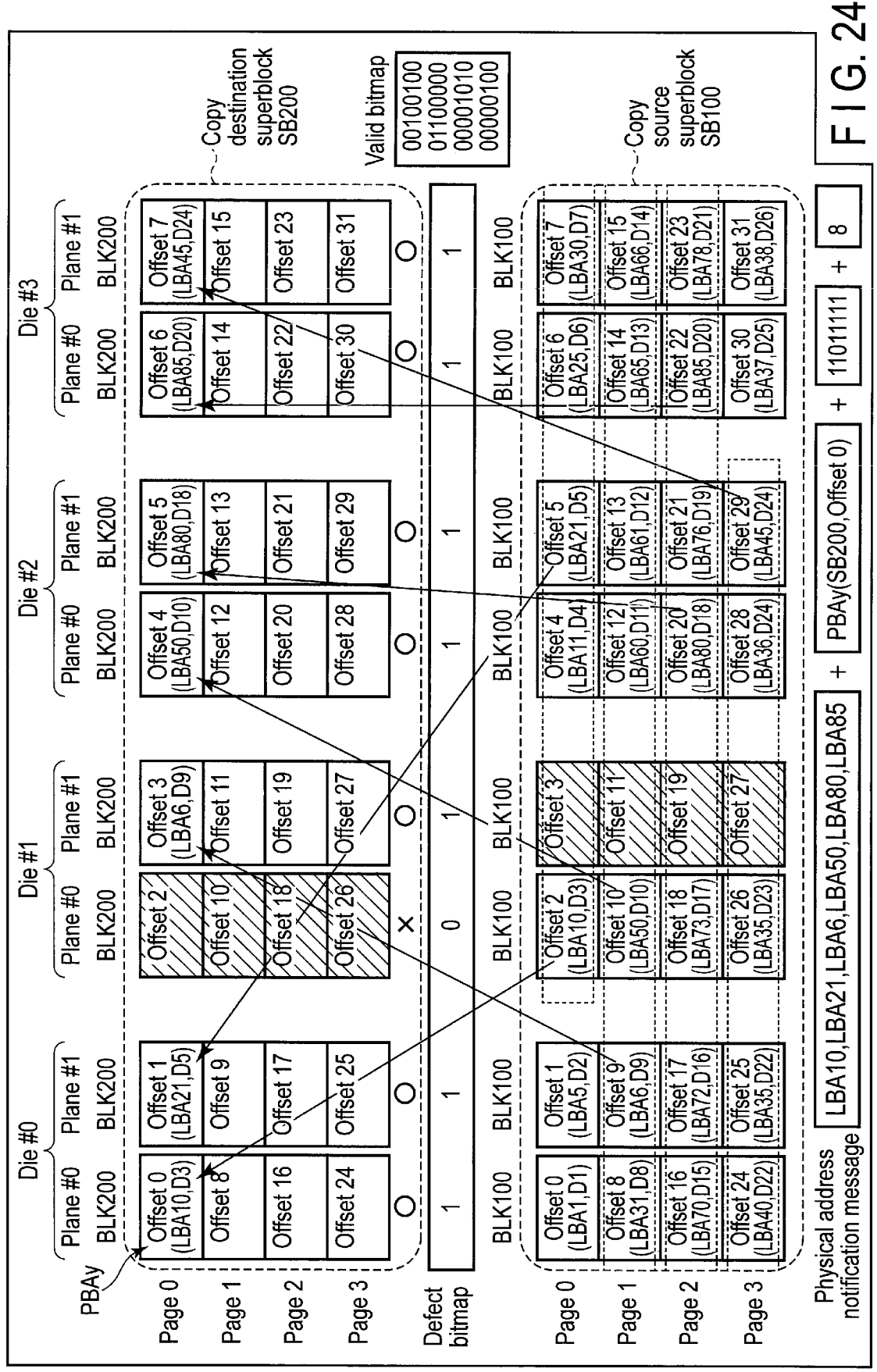
FIG. 24 is a diagram illustrating a data copy operation that the memory system according to the embodiment executes.

FIG. 24 illustrates a data copy operation that the flash storage device 3 executes.

FIG. 24 exemplifies a case where a set of pieces of valid data is copied from the copy source superblock SB100 to a copy destination superblock SB200. The copy destination superblock may be automatically selected from a list of free superblocks by the controller 4 or the address (superblock address) of the copy destination superblock may be specified by the copy command.

Exemplarily, the copy destination superblock SB200 has eight physical blocks (physical block BLK200 included in the plane #0 of the die #0, physical block BLK200 included in the plane #1 of the die #0, physical block BLK200 included in the plane #0 of the die #1, physical block BLK200 included in the plane #1 of the die #1, physical block BLK200 included in the plane #0 of the die #2, physical block BLK200 included in the plane #1 of the die #2, physical block BLK200 included in the plane #0 of the die #3, and physical block BLK200 included in the plane #1 of the die #3).

In the eight physical blocks, the physical block BLK200 of the plane #0 of the die #1 is a defective physical block and the other physical blocks each are a non-defective physical block.

The controller 4 copies the set of pieces of valid data in the copy source superblock SB100 (here, D3, D5, D9, D10, D18, D20, and D24) to the non-defective physical blocks belonging to the copy destination superblock SB200 (physical block BLK200 included in the plane #0 of the die #0, physical block BLK200 included in the plane #1 of the die #0, physical block BLK200 included in the plane #1 of the die #1, physical block BLK200 included in the plane #0 of the die #2, physical block BLK200 included in the plane #1 of the die #2, physical block BLK200 included in the plane #0 of the die #3, and physical block BLK200 included in the plane #1 of the die #3), in units of predetermined data sizes like page sizes, such that copying of any valid data to the defective physical block belonging to the copy destination superblock SB200 (physical block BLK200 of the plane #0 of the die #1) is skipped. In this case, the controller 4 copies a plurality of pairs each including valid data and the identifier (e.g., LBA) of the valid data from the copy source superblock SB100 to the copy destination superblock SB200 as follows.

(1) Copying of LBA10 and data D3: The controller 4 first reads a pair of LBA3 and valid data D3 stored in page 0 of the physical block BLK100 of the plane #0 of the die #1 of the copy source superblock SB100, and copies the pair of LBA3 and valid data D3 to page 0 of the physical block BLK200 of the plane #0 of the die #0 of the copy destination superblock SB200.

(2) Copying of LBA21 and data D5: The controller 4 reads a pair of LBA21 and valid data D5 stored in page 0 of the physical block BLK100 of the plane #1 of the die #2 of the copy source superblock SB100, and copies the pair of LBA21 and valid data D5 to page 0 of the physical block BLK200 of the plane #1 of the die #0 of the copy destination superblock SB200.

(3) Copying of LBA6 and data D9: The controller 4 reads a pair of LBA6 and valid data D9 stored in page 1 of the physical block BLK100 of the plane #1 of the die #0 of the copy source superblock SB100, and copies the pair of LBA6 and valid data D9 to page 0 of the physical block BLK200 of the plane #1 of the die #1 of the copy destination superblock SB200.

(4) Copying of LBA50 and data D10: The controller 4 reads a pair of LBA50 and valid data D10 stored in page 1 of the physical block BLK100 of the plane #0 of the die #1 of the copy source superblock SB100, and copies the pair of LBA50 and valid data D10 to page 0 of the physical block BLK200 of the plane #0 of the die #2 of the copy destination superblock SB200.

(5) Copying of LBA80 and data D18: The controller 4 reads a pair of LBA80 and valid data D18 stored in page 2 of the physical block BLK100 of the plane #0 of the die #2 of the copy source superblock SB100, and copies the pair of LBA80 and valid data D18 to page 0 of the physical block BLK200 of the plane #1 of the die #2 of the copy destination superblock SB200.

(6) Copying of LBA85 and data D20: The controller 4 reads a pair of LBA85 and valid data D20 stored in page 2 of the physical block BLK100 of the plane #0 of the die #3 of the copy source superblock SB100, and copies the pair of LBA85 and valid data D20 to page 0 of the physical block BLK200 of the plane #0 of the die #3 of the copy destination superblock SB200.

(7) Copying of LBA45 and data D24: The controller 4 reads a pair of LBA45 and valid data D24 stored in page 3 of the physical block BLK100 of the plane #1 of the die #2 of the copy source superblock SB100, and copies the pair of LBA45 and valid data D24 to page 0 of the physical block BLK200 of the plane #1 of the die #3 of the copy destination superblock SB200.

In this manner, the set of pieces of valid data is copied from the copy source superblock SB100 to the non-defective physical blocks of the copy destination superblock SB200.

Then, the controller 4 notifies the host 2 of the plurality of identifiers (LBA10, LBA21, LBA6, LBA50, LBA80, LBA85, and LBA45) corresponding one-to-one to the plurality of pieces of valid data copied (D3, D5, D9, D10, D18, D20, and D24), the top copy destination physical address PBAy (SB200, offset 0) to which the set of pieces of valid data is copied, the length of the set of pieces of valid data (D3, D5, D9, D10, D18, D20, and D24) (=7), the defect bitmap "11011111" corresponding to the copy destination superblock SB200, and the length of the defect bitmap (=8), as the physical address notification message (address change request).

According to the present embodiment, the controller 3 can write both of the write data from the host 2 and the LBA from the host 2, into the write destination superblock. Thus, because the controller 3 can easily acquire the LBA of each piece of valid data in the copy source superblock from the copy source superblock, the controller 3 can easily notify the host 2 of the plurality of LBAs corresponding one-to-one to the plurality of pieces of valid data copied.

When the host 2 receives the physical address notification message (address change request) from the controller 3, the host 2 executes processing similar to the processing described with FIG. 11. Thus, the LUT of the host FTL can be updated such that the copy destination physical addresses of the copied pieces of valid data D3, D5, D9, D10, D18, D20, and D24 are associated one-to-one with LBA10, LBA21, LBA6, LBA50, LBA80, LBA85, and LBA45 corresponding to the copied pieces of valid data D3, D5, D9, D10, D18, D20, and D24.

In the LUT of the host FTL, the physical address (superblock address and offset) corresponding to LBA10 is updated from the copy source physical address (SB100, offset 2) to the copy destination physical address (SB200, offset 0). Similarly, the physical address (superblock address and offset) corresponding to LBA21 is updated from the copy source physical address (SB100, offset 5) to the copy destination physical address (SB200, offset 1). The physical address (superblock address and offset) corresponding to LBA6 is updated from the copy source physical address (SB100, offset 9) to the copy destination physical address (SB200, offset 3). The physical address (superblock address and offset) corresponding to LBA50 is updated from the copy source physical address (SB100, offset 10) to the copy destination physical address (SB200, offset 4). The physical address (superblock address and offset) corresponding to LBA80 is updated from the copy source physical address (SB100, offset 20) to the copy destination physical address (SB200, offset 5). The physical address (superblock address and offset) corresponding to LBA85 is updated from the copy source physical address (SB100, offset 22) to the copy destination physical address (SB200, offset 6). The physical address (superblock address and offset) corresponding to LBA45 is updated from the copy source physical address (SB100, offset 29) to the copy destination physical address (SB200, offset 7).

Note that the physical address notification message (address change request) may further include the address (SB100) of the copy source superblock SB100 and the offset (=2) indicating the top copy source physical storage location in the copy source superblock SB100 in which the pieces of valid data D3, D5, D9, D10, D18, D20, and D24 are stored. Thus, the host 2 can recognize the copy source physical address of each piece of valid data copied. Therefore, for each LBA specified by the physical address notification message (address change request), the host 2 can determine whether the current physical address stored in the LUT of the host FTL agrees with the copy source physical address. Only in a case where the current physical address agrees with the copy source physical address, the current physical address can be updated to the copy destination physical address.

For example, in a case where a write command specifying LBA10 is sent from the host 2 to the controller 4 during the data copy operation in which the pieces of valid data D3, D5, D9, D10, D18, D20, and D24 are copied from the copy source superblock SB100 to the copy destination superblock SB200, update data (latest data) corresponding to LBA10 is written into the write destination physical storage location of the write destination superblock, and then the LUT of the host FTL is updated such that the latest physical address indicating the write destination physical storage location is associated with LBA10. If the physical address notification message (address change request) is sent from the controller 4 to the host 2 thereafter, the latest physical address indicating the write destination physical storage location in which the update data corresponding to LBA10 is stored, is likely to be wrongly changed to the physical address indicating the copy destination physical storage location to which the former data corresponding to LBA10 is copied.

According to the present embodiment, the physical address notification message (address change request) including the address (SB100) of the copy source superblock SB100 and the offset (=2) indicating the top copy source physical storage location in the copy source superblock SB100 in which the pieces of valid data D3, D5, D9, D10, D18, D20, and D24 are stored, is sent to the host 2. Therefore, the host 2 can update the current physical address to the copy destination physical address only in a case where the current physical address stored in the LUT of the host FTL agrees with the copy source physical address. Thus, even in a case where the write operation corresponding to the write command specifying LBA10 is executed during the data copy operation in which the pieces of valid data D3, D5, D9, D10, D18, D20, and D24 are copied, the latest physical address indicating the write destination physical storage location in which the update data corresponding to LBA10 is stored, can be prevented from being changed to the physical address indicating the copy destination physical storage location to which the former data corresponding to LBA10 is copied.

Figure 25:
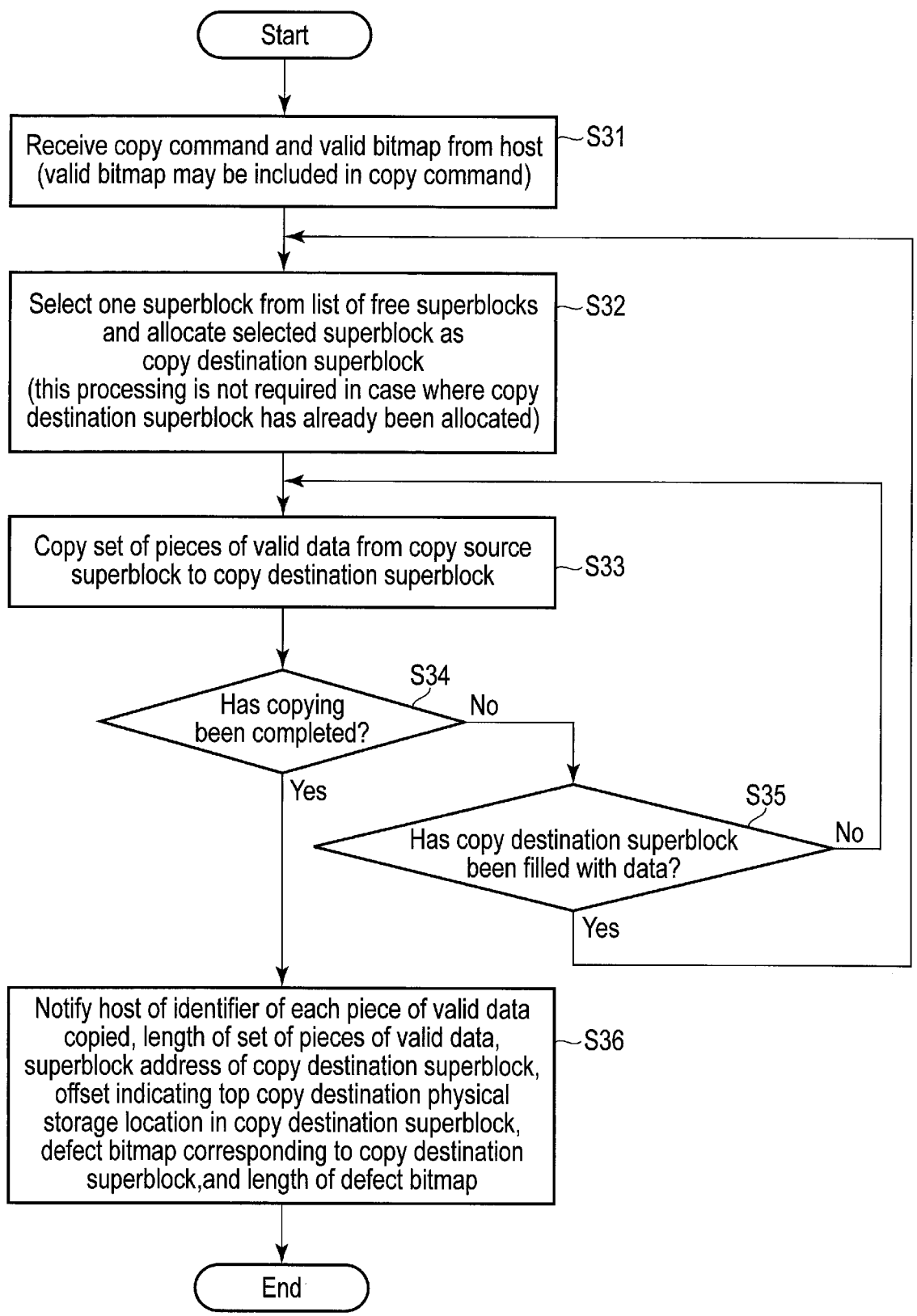
FIG. 25 is a flowchart illustrating the procedure of a copy destination block allocation operation and a data copy operation that the memory system according to the embodiment executes.

FIG. 25 is a flowchart illustrating the procedure of a copy destination superblock allocation operation and a data copy operation that the flash storage device 3 executes.

The controller 4 receives a copy command specifying the copy source superblock and the valid bitmap corresponding to the copy source superblock, from the host 2 (step S31). The valid bitmap corresponding to the copy source superblock may be included in the copy command.

The controller 4 selects one superblock (free superblock) in the common flash block pool 602 that is a list of free superblocks. Then, the controller 4 allocates the selected superblock as the copy destination superblock (step S32). Note that if the copy destination superblock has already been allocated, the allocation operation does not need to be executed. In a case where the address (superblock address) of the copy destination superblock is specified by the copy command, the controller 4 selects the free superblock having the specified superblock address, from the common flash block pool 602, and then allocates the selected superblock as the copy destination superblock.

Based on the valid bitmap corresponding to the copy source superblock, the controller 4 copies a set of pieces of valid data from the copy source superblock to the copy destination superblock (step S33). At step S33, based on the defect bitmap corresponding to the copy destination superblock, the controller 4 copies the set of pieces of valid data in the copy source superblock, to each non-defective physical block belonging to the copy destination superblock, in units of predetermined data sizes like page sizes, such that copying of any valid data to any defective physical block belonging to the copy destination superblock is skipped.

When the entirety of the copy destination superblock is filled by copying of some pieces of valid data from the plurality of pieces of valid data in the copy source superblock (NO at step S34 and YES at step S35), the controller 4 selects one superblock (free superblock) in the common flash block pool 801, and allocates the selected block as a new copy destination superblock (step S32). Then, based on the defect bitmap corresponding to the new copy destination superblock, the controller 4 copies a set of the remaining pieces of valid data in the copy source superblock, to each non-defective physical block belonging to the new copy destination superblock, in units of predetermined data sizes like page sizes, such that copying of any valid data to any defective physical block belonging to the new copy destination superblock is skipped (step S33).

When copying of all valid data in the copy source superblock is completed (YES at step S34), the controller 4 notifies the host 2 of the identifier of each piece of valid data copied, the length of the set of pieces of valid data copied, the address (superblock address) of the copy destination superblock to which the set of pieces of valid data is copied, the offset indicating the top copy destination physical storage location in the copy destination superblock in which the set of pieces of valid data is copied, the defect bitmap corresponding to the copy destination superblock, and the length of the defect bitmap (step S36).

Note that, the valid bitmap indicating whether valid data is present every physical storage location having a size of 16K bytes corresponding to the page size, has been described above. However, the valid bitmap may indicate whether valid data is present every physical storage location having a smaller size than the page size. For example, in a case where the minimum unit of address specification with the LBA specified by the host 2 is 4K bytes, the valid bitmap may indicate whether valid data is present every physical storage location having a size of 4K bytes (4 KB).

As described above, according to the present embodiment, instead of physical address information for a plurality of sets corresponding one-to-one to a plurality of physical storage regions that is discontinuous, the host 2 is notified of the top physical address (superblock address, offset) in which the write data is written, the length of the write data, and the defect bitmap corresponding to the write destination superblock. Therefore, even in a case where the write data is divided into a plurality of data portions corresponding to a plurality of physical storage regions that is discontinuous, due to the presence of a defective block belonging to the write destination superblock, the amount of information necessary for notifying the host 2 of the write destination physical storage location of the write data, can be inhibited from increasing.

Similarly, in a copy operation, the host 2 is notified of the identifier of each piece of valid data copied to the copy destination superblock, the length of a set of the pieces of valid data, the top copy destination physical address (superblock address, offset) to which the set of the pieces of valid data is copied, and the defect bitmap corresponding to the copy destination superblock. Thus, the amount of information necessary for notifying the host 2 of the copy destination physical storage location, can be inhibited from increasing.

Note that, according to the present embodiment, the NAND flash memory has been exemplified as a nonvolatile memory. However, the function according to the present embodiment can be also applied to other various nonvolatile memories, such as a magnetoresistive random access memory (MRAM), a phase change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of controlling a nonvolatile memory, the nonvolatile memory including a plurality of nonvolatile memory dies each including a plurality of physical blocks, the method comprising:
    managing a plurality of block groups each including a plurality of physical blocks selected from the nonvolatile memory dies;
    in response to receiving a write request from a host, the write request specifying a first identifier of identifying first write data and length of the first write data, writing the first write data into each non-defective physical block belonging to a first block group of the plurality of block groups; and
    notifying the host of first information including: the first identifier; an address specifying the first block group; a first address information indicating a physical storage location in the first block group in which the first write data is written; the length of the first write data; and first bitmap information including a plurality of bits, each of the plurality of bits corresponding to each of the physical blocks belonging to the first block group, each of the plurality of bits having a single value indicating whether or not the entire corresponding physical block is a defective block.

2. The method according to claim 1, wherein the first information further includes length of the first bitmap information indicating a number of the bits included in the first bitmap information.

3. The method according to claim 1, wherein in a case where each of the nonvolatile memory dies included in the nonvolatile memory includes a plurality of planes, each of the plurality of block groups includes a plurality of physical blocks selected one by one from the plurality of planes included in the nonvolatile memory.

4. The method according to claim 1, wherein
    the first address information includes an offset from a top physical storage location of a first block to a top of a physical storage area of the first block in which the first write data is written, and
    the first block is included in the first block group.

5. The method according to claim 1, further comprising:
    in response to receiving a copy request and second bitmap information from the host, the copy request specifying an address of a second block group of the plurality of block groups, the second bitmap information including a plurality of bits corresponding one-to-one to a plurality of physical storage locations in the second block group, each bit having a value indicating whether or not valid data is present in the corresponding physical storage location, copying valid data in the second block group to each non-defective physical block belonging to a third block group of the plurality of block groups; and notifying the host of second information including: an identifier of the valid data copied to the third block group; length of the valid data, an address specifying the third block group; a second address information indicating a copy destination physical storage location in the third block group to which the valid data is copied; and third bitmap information including a plurality of bits, each of the plurality of bits corresponding to each of the physical blocks belonging to the third block group, each bit having a value indicating whether or not the corresponding physical block is a defective block.

6. The method according to claim 5, wherein the second information further includes length of the third bitmap information indicating a number of the bits included in the third bitmap information.

7. The method according to claim 5, wherein
the second address information includes an offset from a top physical storage location of a second block to a top of a physical storage area of the second block in which the valid data is written, and
the second block is included in the third block group.

8. The method according to claim 5, wherein the second information further includes: the address of the second block group; and a third information indicating a physical storage location in the second block group in which the valid data is stored.

9. The method according to claim 5, further comprising:
writing a pair of a data portion and an identifier of identifying the data portion to a block in the first block group; and
copying, in response to receiving the copy request and the second bitmap information from the host, a pair of valid data and an identifier of the valid data, from the second block group to the third block group.

10. The method according to claim 8, wherein
the third address information includes an offset from a top physical storage location of a third block to a top of a physical storage area of the third block in which the valid data is stored, and
the third block is included in the second block group.

* * * * *